(12) United States Patent  
Lee et al.

(10) Patent No.: US 10,536,742 B2  
(45) Date of Patent: Jan. 14, 2020

(54) DISPLAY APPARATUS AND DISPLAY METHOD

(71) Applicant: SAMSUNG ELECTRONICS CO., LTD., Suwon-si (KR)

(72) Inventors: Seung-hwan Lee, Seoul (KR); Yang-sun Ryu, Seongnam-si (KR); Joo-heon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/046,567

(22) Filed: Jul. 26, 2018

(65) Prior Publication Data

US 2018/0359515 A1 Dec. 13, 2018

Related U.S. Application Data

(63) Continuation of application No. 14/933,473, filed on Nov. 5, 2015, now Pat. No. 10,045,066.

(30) Foreign Application Priority Data

Nov. 10, 2014 (KR) .................. 10-2014-0155515

(51) Int. Cl.
| | |
|---|---|
| *H04N 21/431* | (2011.01) |
| *H04N 5/45* | (2011.01) |
| *H04N 21/485* | (2011.01) |
| *H04N 5/445* | (2011.01) |
| *H04N 5/44* | (2011.01) |
| *H04N 21/81* | (2011.01) |

(52) U.S. Cl.
CPC ....... *H04N 21/4316* (2013.01); *H04N 5/4403* (2013.01); *H04N 5/44591* (2013.01); *H04N 5/45* (2013.01); *H04N 21/4312* (2013.01); *H04N 21/4858* (2013.01); *H04N 21/812* (2013.01); *G06F 2203/04803* (2013.01)

(58) Field of Classification Search
None
See application file for complete search history.

(56) References Cited

U.S. PATENT DOCUMENTS

| | | |
|---|---|---|
| 7,889,278 B2 | 2/2011 | Kim et al. |
| 7,987,481 B2 | 7/2011 | Fukuda et al. |
| | (Continued) | |

FOREIGN PATENT DOCUMENTS

| | | |
|---|---|---|
| CN | 1901643 B | 9/2012 |
| EP | 2403239 A1 | 1/2012 |
| WO | 2012/166182 A1 | 12/2012 |

OTHER PUBLICATIONS

Communication dated Feb. 2, 2018, issued by the State Intellectual Property Office of the People's Republic of China in counterpart Chinese Patent Application No. 201510762575.1.

(Continued)

*Primary Examiner* — Omar S Parra  
(74) *Attorney, Agent, or Firm* — Sughrue Mion, PLLC

(57) ABSTRACT

A display apparatus, including a display configured to display a multi-window screen image comprising a plurality of windows; and a controller configured to control the display to change an appearance of at least one window of the plurality of windows based on a setting provided by a user, and to display the at least one window using the changed appearance.

8 Claims, 45 Drawing Sheets

(56) References Cited

U.S. PATENT DOCUMENTS

| | | |
|---|---|---|
| 8,881,191 B2 | 11/2014 | Magdy et al. |
| 2002/0078447 A1 | 6/2002 | Mizutome et al. |
| 2003/0030675 A1 | 2/2003 | Ku et al. |
| 2004/0068740 A1 | 4/2004 | Fukuda et al. |
| 2006/0200842 A1 | 9/2006 | Chapman et al. |
| 2007/0008430 A1 | 1/2007 | Kim et al. |
| 2008/0024666 A1 | 1/2008 | Sudo et al. |
| 2009/0288036 A1 | 11/2009 | Osawa et al. |
| 2010/0026894 A1 | 2/2010 | Osawa |
| 2010/0100899 A1* | 4/2010 | Bradbury ........... H04N 7/17318 725/29 |
| 2010/0199302 A1* | 8/2010 | Girgis .............. G08B 13/19658 725/33 |
| 2011/0069940 A1 | 3/2011 | Shimy et al. |
| 2011/0078733 A1 | 3/2011 | Lee |
| 2013/0339852 A1 | 12/2013 | Poornachandran et al. |
| 2014/0185169 A1 | 7/2014 | Jung et al. |
| 2014/0189742 A1 | 7/2014 | Hyoung et al. |
| 2014/0253801 A1 | 9/2014 | Richman et al. |
| 2016/0127763 A1* | 5/2016 | Patel ................. H04N 21/4312 348/564 |
| 2017/0374427 A9 | 12/2017 | Richman et al. |

OTHER PUBLICATIONS

Communication dated Apr. 28, 2017, issued by the European Patent Office in counterpart European Application No. 15193845.3.
Communication dated Sep. 6, 2016, issued by the European Patent Office in counterpart European Patent Application No. 15193845.3.
Communication dated Apr. 4, 2016, issued by the European Patent Office in counterpart European Patent Application No. 15193845.3.
Search Report dated Apr. 20, 2016, issued by the International Searching Authority in counterpart International Patent Application No. PCT/KR2015/011707 (PCT/ISA/210).
Written Opinion dated Apr. 20, 2016, issued by the International Searching Authority in counterpart International Patent Application No. PCT/KR2015/011707 (PCT/ISA/237).
Communication dated Feb. 8, 2019, issued by the European Patent Office in counterpart European Application No. 15193845.3.
Communication dated Feb. 11, 2019, issued by the European Patent Office in counterpart European Application No. 15193845.3.
Communication dated Jul. 31, 2019, issued by the European Patent Office in counterpart European Application No. 19168664.1.

* cited by examiner

FIG. 1
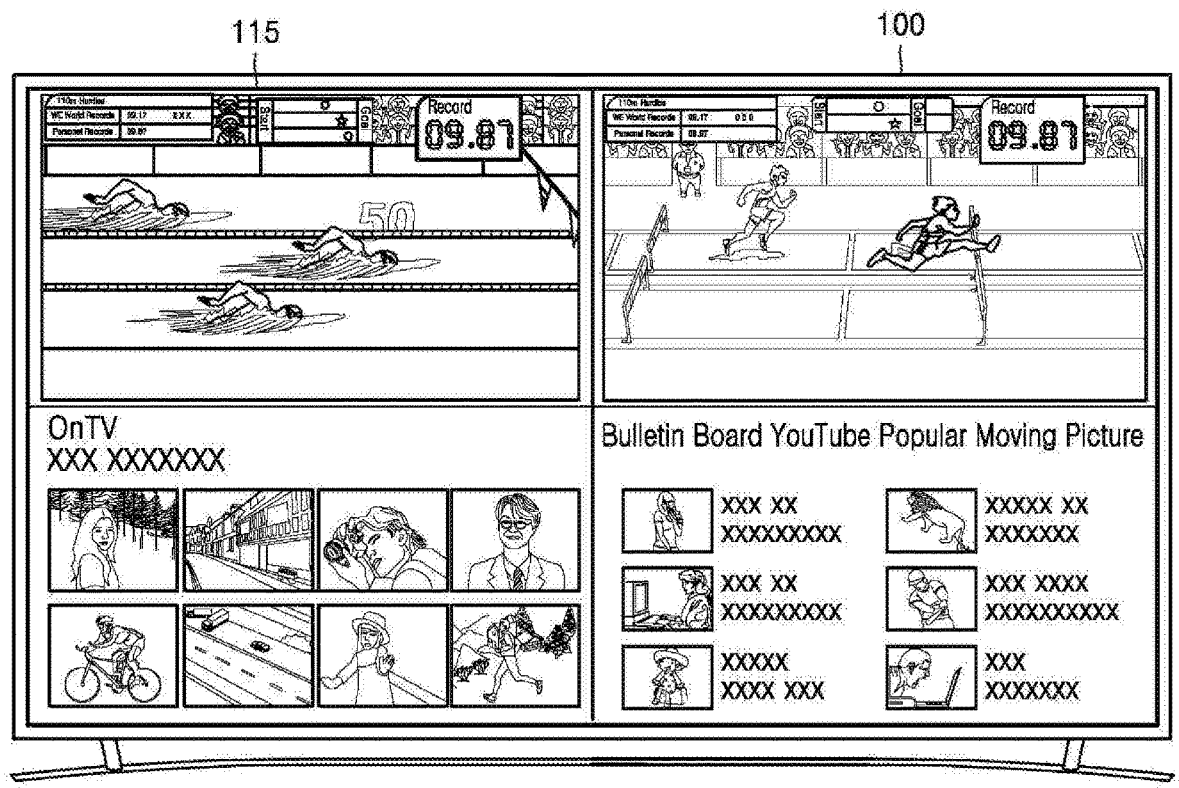
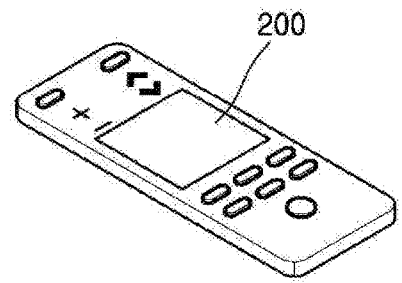

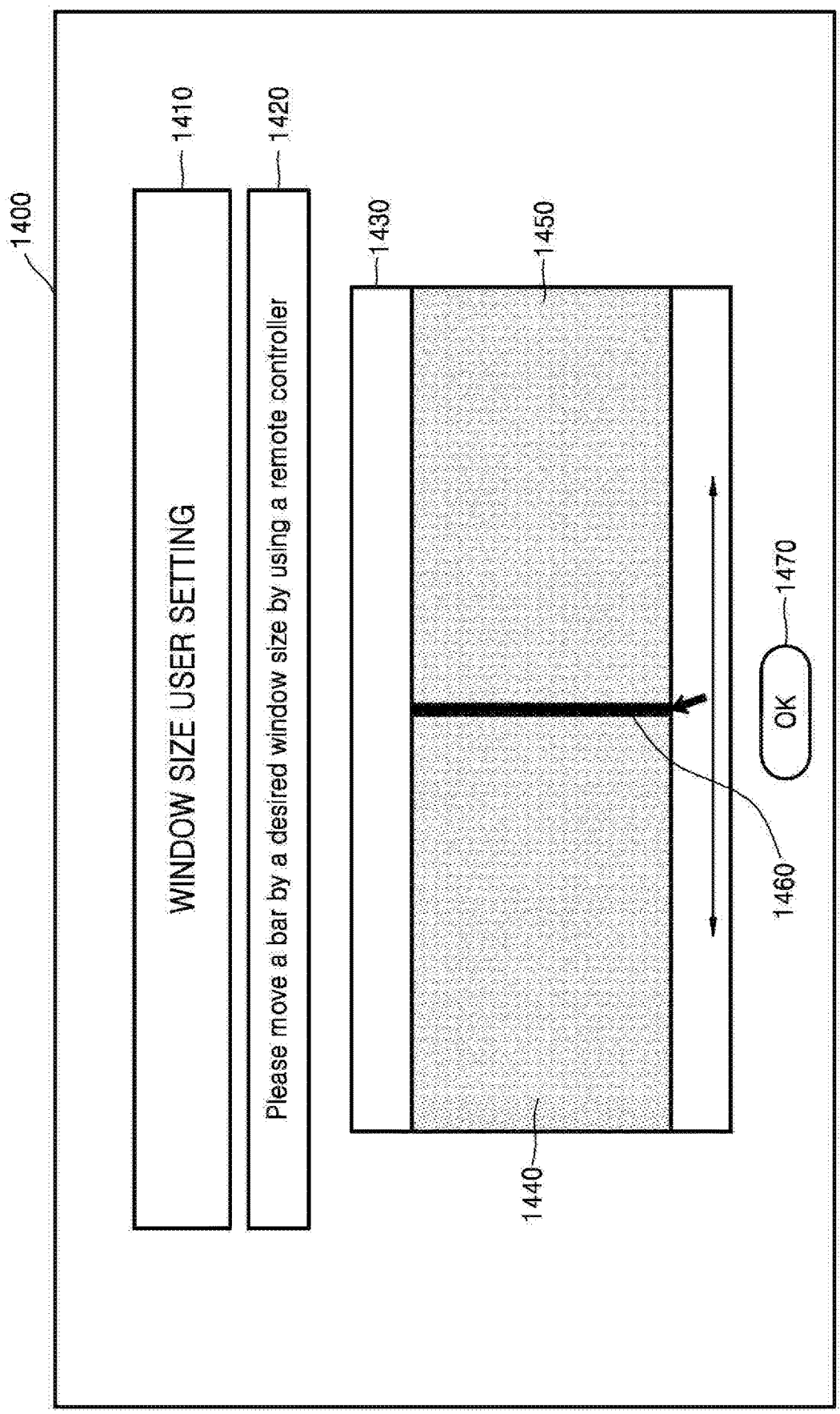

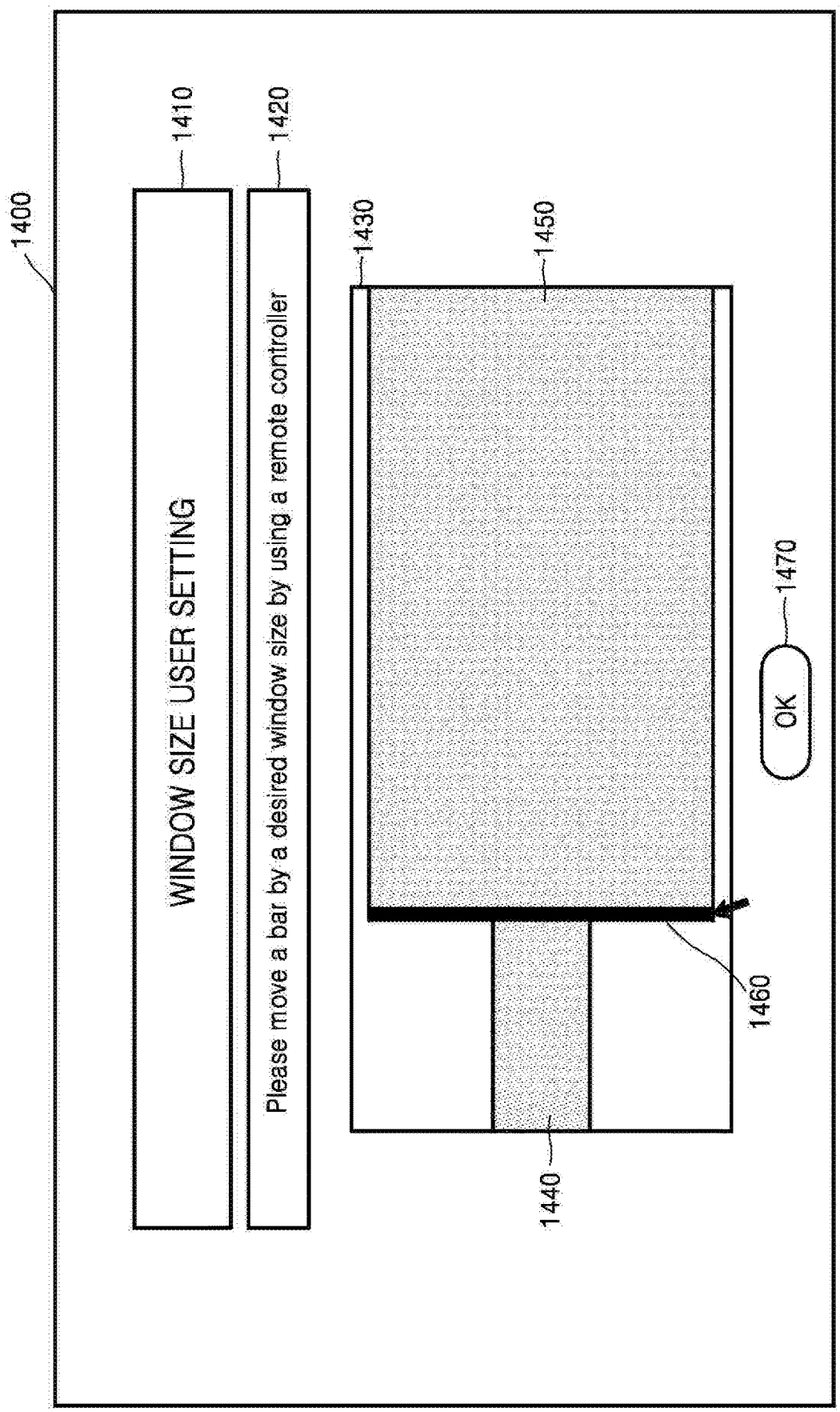

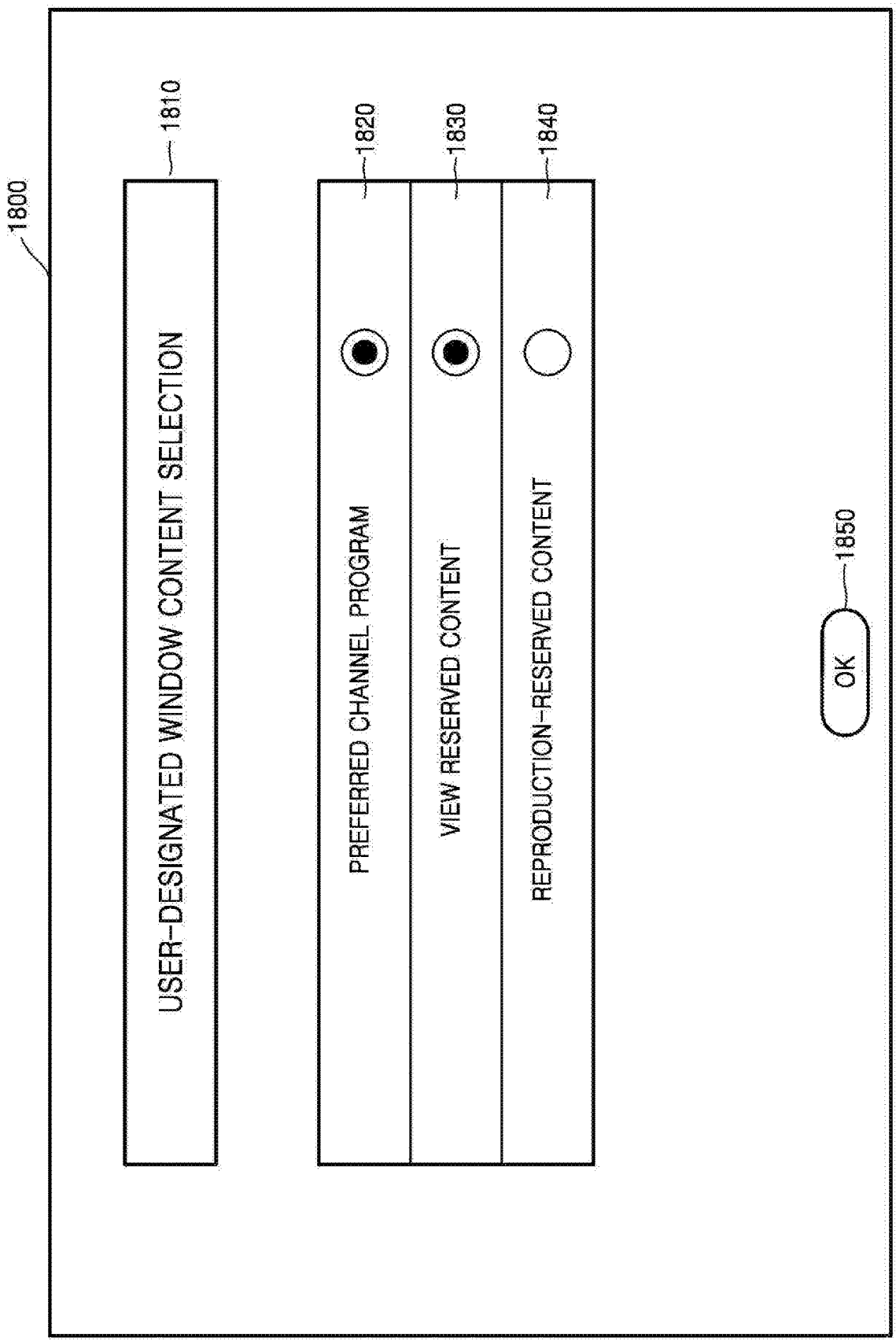

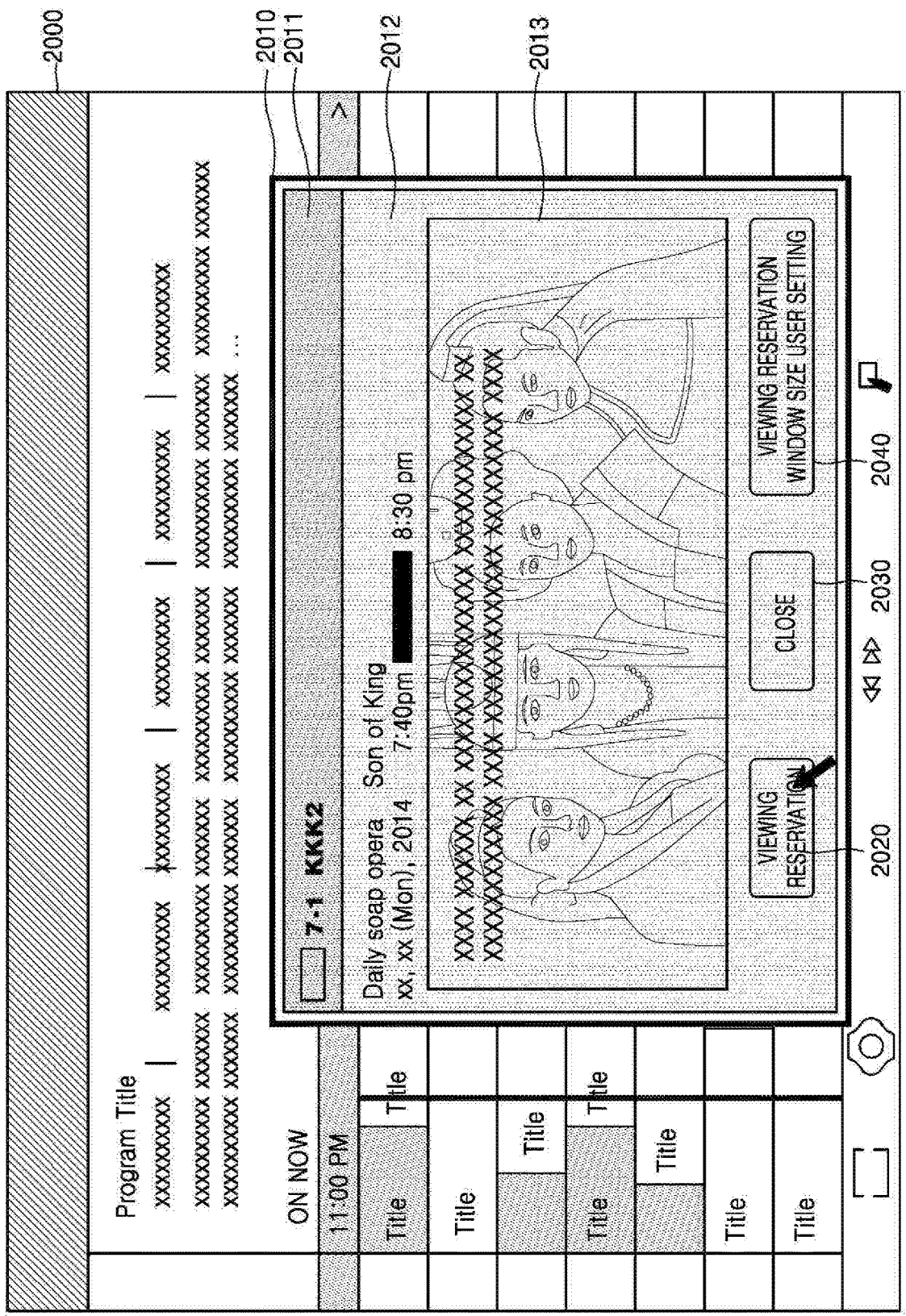

DISPLAY APPARATUS AND DISPLAY METHOD

CROSS-REFERENCE TO RELATED PATENT APPLICATION

This application is a Continuation of U.S. application Ser. No. 14/933,473 filed Nov. 5, 2015, which claims benefit from Korean Patent Application No. 10-2014-0155515, filed on Nov. 10, 2014, in the Korean Intellectual Property Office, the disclosures of which are incorporated herein in their entirety by reference.

BACKGROUND

1. Field

One or more exemplary embodiments relate to a display apparatus and a display method, and more particularly, to a display apparatus that provides a multi-window screen image, and a display method performed by the display apparatus.

2. Description of the Related Art

Display apparatuses have a function of displaying an image that can be viewed by users. Users can view a broadcast via a display apparatus. Display apparatuses display, on a display included therein, broadcasting that a user selects from among broadcasting signals transmitted by a broadcasting station. Currently, most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, and is favorable to error correction, and provides high-resolution and high-definition screen images. In addition, digital broadcasting can provide a bidirectional service, in contrast with analog broadcasting.

Smart TVs providing various types of content in addition to a digital broadcasting function have been recently provided. Smart TVs aim to analyze and provide user needs without manipulations of a user instead of being manually operated according to a selection by a user.

Smart TVs realizing a multi-window screen have also been provided of late.

SUMMARY

One or more exemplary embodiments include a display apparatus which provides a multi-window screen image comprising a plurality of windows and is capable of controlling the plurality of windows, and a display method performed by the display apparatus.

Additional aspects will be set forth in part in the description which follows and, in part, will be apparent from the description, or may be learned by practice of the presented exemplary embodiments.

According to an aspect of an exemplary embodiment, a display apparatus includes a display configured to display a multi-window screen image comprising a plurality of windows; and a controller configured to control the display to change an appearance of at least one window of the plurality of windows based on a setting provided by a user, and to display the at least one window using the changed appearance.

The controller may be further configured to change the appearance of the at least one window by performing at least one from among changing a size of the at least one window, changing a location of the at least one window, and providing a visual effect to the at least one window.

The controller may be further configured to change the appearance of the at least one window based on a signal indicating that content of a preferred channel registered by the user is reproduced on the at least one window.

The controller may be further configured to change the appearance of the at least one window based on a signal indicating that at least one from among content associated with a viewing reservation registered by the user, or content associated with a reproduction reservation registered by the user, is reproduced on the at least one window.

The controller may be further configured to determine an identity of the user and change the appearance of the at least one window based on a user setting corresponding to the determined identity.

According to another aspect of an exemplary embodiment, a display apparatus includes a display configured to display a multi-window screen image comprising a plurality of windows; and a controller configured to control the display to change an appearance of at least one window of the plurality of windows based on content being reproduced on the at least one window, and to display the at least one window using the changed appearance.

The controller may be further configured to change the appearance of the at least one window by performing at least one from among changing a size of the at least one window, changing a location of the at least one window, and providing a visual effect to the at least one window.

The controller may be further configured to change a size of the at least one window based on an attribute of the content.

The controller may be further configured to change the size of the at least one window from a first size to a second size based on a first signal indicating that the attribute has a specific value, and to restore the size of the at least one window to the first size based on a second signal indicating that the attribute does not have the specific value.

The controller may be further configured to reduce a size of the at least one window based on a signal indicating that an attribute of the content is an advertisement.

The controller may be further configured to change the appearance of the at least one window based on a signal indicating that the content is being recorded, or a signal indicating that the content is being transmitted to an external apparatus.

The controller may be further configured to change a size of an application item associated with the at least one window.

According to yet another aspect of an exemplary embodiment, a display method includes displaying a multi-window screen image including a plurality of windows; changing an appearance of at least one window of the plurality of windows based on a user setting; and displaying the at least one window using the changed appearance.

Changing the appearance of the at least one window may further include at least one from among changing a size of the at least one window, changing a location of the at least one window, and providing a visual effect to the at least one window.

Changing the appearance of the at least one window may further include changing the appearance of the at least one window based on a signal indicating that content of a preferred channel registered by the user is reproduced on the at least one window.

Changing the appearance of the at least one window may further include changing the size of the at least one window based on a signal indicating that at least one from among content associated with a viewing reservation registered by the user, or content associated with a reproduction reservation registered by the user is reproduced on the at least one window.

According to a further aspect of an exemplary embodiment, a display method includes displaying a multi-window screen image including a plurality of windows; changing an appearance of at least one window of the plurality of windows based on content that is reproduced on the at least one window; and displaying the at least one window using the changed appearance.

Changing the appearance of the at least one window may further include at least one from among changing a size of the at least one window, changing a location of the at least one window, and providing a visual effect to the at least one window.

Changing the appearance of the at least one window may further include reducing the size of the at least one window based on a signal indicating that an attribute of the content is an advertisement.

The method may further include changing a size of an application item associated with the at least one window.

According to a still further aspect of an exemplary embodiment, a display method includes displaying a multi-window screen image including a plurality of windows; detecting a content displayed on at least one window of the plurality of windows; determining a user setting relating to the content; changing an appearance of the at least one window based on the user setting and the content; and displaying the at least one window using the changed appearance.

Changing the appearance of the at least one window may further include at least one from among changing a size of the at least one window, changing a location of the at least one window, and providing a visual effect to the at least one window.

BRIEF DESCRIPTION OF THE DRAWINGS

These and other aspects will become apparent and more readily appreciated from the following description of the exemplary embodiments, taken in conjunction with the accompanying drawings in which:

FIG. 1 is a schematic view showing an operation between a display apparatus and a control device according to an exemplary embodiment;

FIGS. 14A and 14B illustrate a UI that may be provided when a <window size user setting> item is selected by a user in FIG. 13 according to exemplary embodiments;

FIG. 18 illustrates a UI that may be provided when a <user-designated window content selection> item is selected by a user in FIG. 13, according to an exemplary embodiment;

FIG. 20 illustrates a UI for setting a viewing reservation, according to an exemplary embodiment;

DETAILED DESCRIPTION

Figure 2:
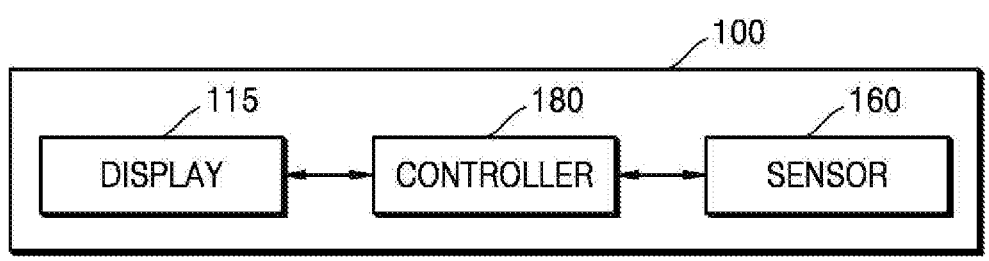
FIG. 2 is a block diagram of the display apparatus according to an exemplary embodiment.

Reference will now be made in detail to exemplary embodiments, examples of which are illustrated in the accompanying drawings. A method of constructing and using an electronic device, according to an exemplary embodiment, will now also be described with reference to the accompanying drawings. Like reference numerals or characters in the drawings denote like parts or components.

While such terms as "first", "second", etc., may be used to describe various components, such components must not be limited to the above terms. The above terms are used only to distinguish one component from another. For example, a first component discussed below could be termed a second component, and similarly, a second component may be termed a first component without departing from the teachings of this disclosure. The term "and/or" includes any and all combinations of one or more of the associated listed items.

Selection of a key arranged on a control device may be used as terminology that means pressing of a key on a control device, touch of a key on a touch pad, or drag of a key on a touch pad.

Content may include video, audio, text, or web documents.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 is a schematic view showing an operation between a display apparatus 100 and a control device 200 according to an exemplary embodiment.

Referring to FIG. 1, the display apparatus 100 and the control device 200 are capable of communicating with each other by wire or wirelessly.

The control device 200 may control the display apparatus 100 via short-range communication including infrared or Bluetooth. The control device 200 may be manipulated by a user to control a function of the display apparatus 100 by using at least one selected from keys (including buttons) included in the control device 200, a touch pad, a microphone capable of receiving voices of users, and a sensor capable of recognizing motions of the control device 200.

The control device 200 includes a power on/off button for turning on or off the display apparatus 100. The control device 200 may change a channel, adjust the volume, select terrestrial broadcasting/cable broadcasting/satellite broadcasting, or perform setting of the display apparatus 100 according to a user input.

The display apparatus 100 may be implemented by using not only a flat display apparatus but also a curved display apparatus having a curvature or flexible display apparatus capable of adjusting a curvature. An output resolution of the display apparatus 100 may be, for example, a high definition (HD), a full HD, an ultra HD, or a resolution that is clearer or higher than an ultra HD. A diagonal length of the screen of the display apparatus 100 may be, for example, 650 mm or less, 660 mm, 800 mm, 1,010 mm, 1,520 mm, 1,890 mm, or no less than 2,000 mm. A horizontal/vertical length of the screen of the display apparatus 100 may be, for example, 643.4 mm×396.5 mm, 934.0 mm×548.6 mm, 1,670.2 mm×962.7 mm, or 2,004.3 mm×1,635.9 mm. Alternatively, a width/length ratio or any type of aspect ratio of the screen of the display apparatus 100 may be, for example, 4:3, 16:9, 16:10, 21:9, or 21:10.

The term "user" used herein denotes a person who controls a function or operation of the display apparatus 100 by using the control device 200. Examples of the user may include a viewer, a manager, or an installation engineer.

According to an exemplary embodiment, the display apparatus 100 may provide a multi-window screen image including a plurality of windows to a display 115 and may control at least one of the plurality of windows that constitute the multi-window screen image.

According to an exemplary embodiment, the display apparatus 100 may change the area of at least one of the plurality of windows based on a user's setting and provide the at least one window of which the area is changed. In some exemplary embodiments, changing an area of a window may include changing an appearance of the window, for example by changing a size of the window, a location of the window, or adding a visual effect to the window.

According to an exemplary embodiment, the display apparatus 100 may change the area of at least one of the plurality of windows based on content that is reproduced on the at least one window, and provide the at least one window of which the area is changed.

According to an exemplary embodiment, the display apparatus 100 may change the size of an application item that is output in association with at least one window of which size is changed, and may provide the application item of which the size is changed.

FIG. 2 is a block diagram of the display apparatus 100 according to an exemplary embodiment.

Referring to FIG. 2, the display apparatus 100 includes the display 115, a controller 180, and a sensor 160.

The display 115 outputs a multi-window screen image including a plurality of windows under the control of the controller 180.

The sensor 160 may receive information for an area change setting of at least one of the plurality of windows that constitute the multi-window screen image, information for a preferred channel setting thereof, information for a reproduction reservation setting thereof, information for a viewing reservation setting thereof, and the like from a user under the control of the controller 180.

The controller 180 may control the display 115 to change and output the area of at least one of the plurality of windows that constitute the multi-window screen image, based on a user's setting information received via the sensor 160 or content that is output via the at least one window. The changing of the area of the at least one window may include a size change of the at least one window, a location change thereof, and provision of a visual effect thereto.

Figure 3:
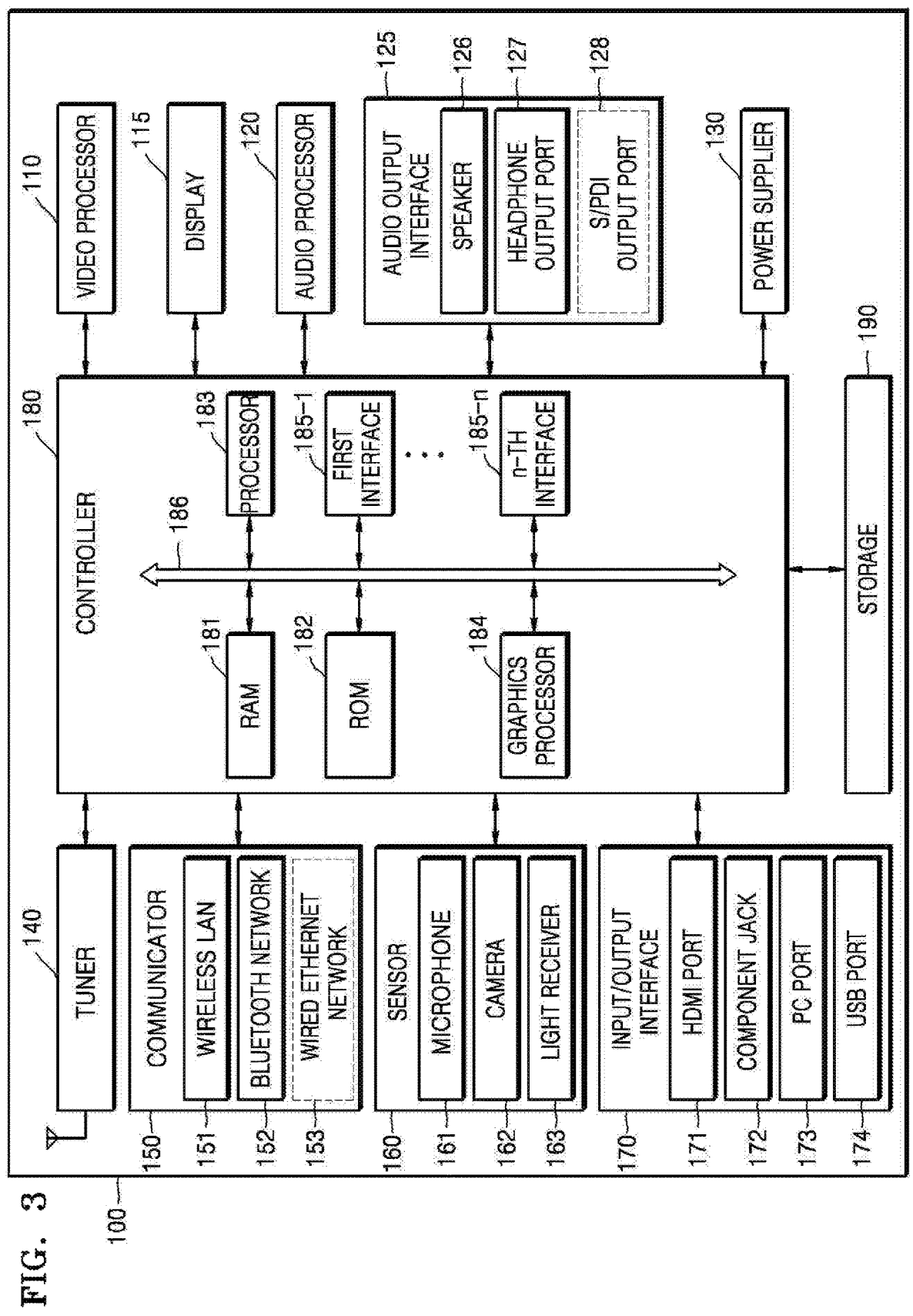
FIG. 3 is a block diagram of a detailed structure of the display apparatus, according to an exemplary embodiment.

FIG. 3 is a block diagram of a detailed structure of the display apparatus 100 according to an exemplary embodiment.

Referring to FIG. 3, the display apparatus 100 includes a video processor 110, the display 115, an audio processor 120, the audio output interface 125, a power supplier 130, a tuner 140, a communicator 150, the sensor 160, an input/output interface 170, the controller 180, and a storage 190.

The video processor 110 processes video data that is received by the display apparatus 100. The video processor 110 may perform various image processing operations, such as decoding, scaling, noise filtering, frame rate transformation, and resolution transformation, on video data.

According to an exemplary embodiment, when the display 115 is provided with a multi-window screen image including a plurality of windows and videos corresponding to a plurality of pieces of content are respectively output to the plurality of windows, the video processor 110 may process the videos corresponding to the plurality of pieces of content by using a plurality of video processing modules.

According to an exemplary embodiment, when the size of at least one of the plurality of windows that constitute the multi-window screen image is changed, the video processor 110 may perform processing, such as decoding, scaling, noise filtering, frame rate transformation, or resolution transformation, with respect to video data such that the video data suits the changed size of the at least one window.

The display 115 displays video included in a broadcasting signal received via the tuner 140 on the screen thereof, under the control of the controller 180. The display 115 may also display content (for example, a moving picture) that is input via the communicator 150 or the input/output interface 170. The display 115 may output an image stored in the storage 190 under the control of the controller 180. The display 115 may also display a voice user interface (UI) (e.g., including a voice command word guide) for performing a voice recognition task corresponding to voice recognition, or a motion UI (e.g., including a user motion guide for motion recognition) for performing a motion recognition task corresponding to motion recognition.

The display 115 may provide a multi-window screen image including a plurality of windows under the control of the controller 180.

The display 115 may change and output the area of at least one of the plurality of windows, under the control of the controller 180. The changing of the area of the at least one window may include a size change of the at least one window, a location change thereof, and provision of a visual effect thereto.

When the display 115 changes the size or location of the at least one window under the control of the controller 180, the display 115 may change the size or location of a window other than the at least one window and output the window with the changed size or location.

The display 115 may output a UI capable of receiving user settings in order to change the size or location of the at least one window or to provide a visual effect to the at least one window. The UI will be described below with reference to FIGS. 13-21.

The display 115 may output a UI for a user-preferred channel setting, a viewing reservation setting, and a reproduction reservation setting.

The audio processor 120 processes audio data. The audio processor 120 may perform various processing operations, such as decoding, amplification, and noise filtering, on the audio data. The audio processor 120 may include a plurality of audio processing modules to process audios corresponding to a plurality of pieces of content.

The audio output interface 125 outputs audio included in a broadcasting signal received via the tuner 140, under the control of the controller 180. The audio output interface 125 may also output audio (for example, a voice or a sound) that is input via the communicator 150 or the input/output interface 170. The audio output interface 125 may also output audio stored in the storage 190 under the control of the controller 180. The audio output interface 125 may, in some exemplary embodiments, include at least one from among a speaker 126, a headphone output port 127, and a Sony/Philips Digital Interface (S/PDIF) output port 128. In some exemplary embodiments, the audio output interface 125 may include a combination of the speaker 126, the headphone output port 127, and the S/PDIF output port 128.

At the point of time when the audio output interface 125 changes and outputs the audio corresponding to the at least one window from among the plurality of windows included in the multi-window screen image, the audio output interface 125 may, in some exemplary embodiments, output a predetermined signal sound to inform a user that the window area has been changed, under the control of the controller 180.

The power supplier 130 supplies power that is input from an external power source, to the internal components 110-190 of the display apparatus 100, under the control of the controller 180. The power supplier 130 may also supply power that is output by one or more batteries located in the display apparatus 100, to the internal components 110-190 of the display apparatus 100, under the control of the controller 180.

The tuner 140 may tune and select a frequency of a channel that the display apparatus 100 wants to receive from among many radio wave components that are obtained by, for example, amplifying, mixing, or resonating a wired or wireless broadcasting signal. The broadcasting signal may include audio, video, and additional information (for example, an electronic program guide (EPG)).

The tuner 140 may receive a broadcasting signal in a frequency band corresponding to a channel number (e.g., cable broadcasting No. 506) according to a user input (for example, a control signal received from the control device 200, e.g., a channel number input, a channel up-down input, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 may be decoded (for example, audio decoding, video decoding, or additional information decoding) and thus may be divided into audio, video, and/or additional information. The audio, the video, and/or the additional information may be stored in the storage 190 under the control of the controller 180.

The display apparatus 100 may include a single tuner 140 or a plurality of tuners 140. According to an exemplary embodiment, when a plurality of tuners 140 are included, the plurality of tuners 140 may output a plurality of broadcasting signals to the plurality of windows included in the multi-window screen image provided to the display 115.

In some exemplary embodiments, the tuner 140 may be all-in-one with the display apparatus 100, or implemented as a separate apparatus (for example, a tuner that is connected to a set-top box and the input/output interface 170) having a tuner that is electrically connected to the display apparatus 100.

The communicator 150 may connect the display apparatus 100 to an external apparatus (for example, an audio apparatus) under the control of the controller 110. The controller 180 may transmit/receive content to/from the external apparatus connected via the communicator 150, download an application from the external apparatus, or perform web-browsing. The communicator 150 may include a wireless local area network (LAN) 151, a Bluetooth network 152, or a wired Ethernet network 153 in correspondence to a performance and a structure of the display apparatus 100. The communicator 150 may include a combination of the wireless LAN 151, the Bluetooth network 152, and the wired Ethernet network 153. The communicator 150 may receive a control signal of the control device 200 under the control of the controller 110. The control signal may be implemented as a Bluetooth signal, a radio frequency (RF) signal, or a Wi-Fi signal.

According to an exemplary embodiment, the communicator 150 may receive content that is output to at least one of the plurality of windows included in the multi-window screen image via the Internet and provide the received content to the controller 180, the video processor 110, or the display 115.

The communicator 150 may further include local area communication (for example, near field communication (NFC) or Bluetooth low energy (BLE)), instead of the Bluetooth network 152.

The sensor 160 may sense a voice of a user, an image of the user, or an interaction with the user.

A microphone 161 may receive a voice of the user. The microphone 161 may transform the received voice into an electrical signal and output the electrical signal to the controller 180. The user voice may include or convey, for example, a voice or a voice command corresponding to a menu or function of the display apparatus 100. In some exemplary embodiments, a recognition range of the microphone 161 may be recommended to be within 4 m from the microphone 161 to a location of the user, and may vary in correspondence to the magnitude of the voice of the user and a surrounding environment (for example, a speaker sound or ambient noise).

According to an exemplary embodiment, the microphone 161 may receive a voice or the like uttered by a user who views the display apparatus 100, and output audio data corresponding to the received voice or the like to the controller 180 so that the controller 180 may use the audio data to identify the user.

The microphone 161 may be integrated with or separate from the display apparatus 100. The separated microphone 161 may be electrically connected to the display apparatus 100 via the communicator 150 or the input/output interface 170.

It will be easily understood by one of ordinary skill in the art that in some exemplary embodiments the microphone 161 may be excluded according to the performance and structure of the display apparatus 100.

A camera 162 may receive an image (for example, consecutive frames) corresponding to a motion of the user including a gesture within a recognition range of the camera 162. For example, the recognition range of the camera 162 may be a distance within 0.1 to 5 m from the camera 162 to the user. The motion of the user may include a part of the body of the user or a motion or the like of the part of the user, such as the face, a facial expression, the hand, the fist, and a finder of the user. The camera 162 may convert a received image into an electrical signal under the control of the controller 180 and output the electrical signal to the controller 180.

According to an exemplary embodiment, the camera 162 may photograph the face or the like of a user who views the display apparatus 100, and output a captured face image to the controller 180 so that the controller 180 may use the face image to identify the user.

The controller 180 may select a menu that is displayed on the display apparatus 100 by using a result of the recognition of the received motion, or perform control corresponding to the result of the motion recognition. For example, the control may be channel change, volume adjustment, or indicator movement.

The camera 162 may include a lens and an image sensor. The camera 162 may support optical zoom or digital zoom by using a plurality of lenses and image processing. The recognition range of the camera 162 may be variously set according to the angle of the camera 162 and surrounding environment conditions. When the camera 162 includes a plurality of cameras, a three-dimensional (3D) still image or a 3D motion may be received by the plurality of cameras.

The camera 162 may be integrated with or separate from the display apparatus 100. A separate device including the separate camera 162 may be electrically connected to the display apparatus 100 via the communicator 150 or the input/output interface 170.

It will be easily understood by one of ordinary skill in the art that in some exemplary embodiments the camera 162 may be excluded according to the performance and structure of the display apparatus 100.

A light receiver 163 may receive an optical signal (including a control signal) from the control device 200 via a light window located, for example, in or on the bezel of the display 115. The light receiver 163 may receive an optical signal corresponding to a user input (for example, touch, pressing, a touch gesture, a voice, or a motion) from the control device 200. A control signal may be extracted from the received optical signal under the control of the controller 180.

According to an exemplary embodiment, the light receiver 163 may receive user setting for changing the size of at least one of the plurality of windows included in the multi-window screen image, changing the location thereof, or providing a visual effect to the at least one window, via the control device 200, and output the received user setting to the controller 180.

The light receiver 163 may also receive user settings for a user-preferred channel setting, a viewing reservation setting, and a reproduction reservation setting via the control device 200 and output the received user settings to the controller 180.

The input/output interface 170 may receive video (for example, a moving picture), audio (for example, a voice or music), and additional information (for example, an EPG) from outside the display apparatus 100 under the control of the controller 180. The input/output interface 170 may include a High-Definition Multimedia Interface (HDMI) port 171, a component jack 172, a PC port 173, or a USB port 174. The input/output interface 170 may include a combination of the HDMI port 171, the component jack 172, the PC port 173, and the USB port 174.

According to an exemplary embodiment, the input/output interface 170 may receive content that is output to at least one of the plurality of windows included in the multi-window screen image, and output the received content to the controller 180.

It will be easily understood by one of ordinary skill in the art that the structure and operation of the input/output interface 170 may be variously implemented according to exemplary embodiments.

The controller 180 may control an overall operation of the display apparatus 100 and signal transfer among the internal components 110-190 of the display apparatus 100 and processes data. When there is an input of a user or stored preset conditions are satisfied, the controller 180 may execute an operation system (OS) and various applications that are stored in the storage 190.

The controller 180 may include random-access memory (RAM) 181 that stores a signal or data input by an external source of the display apparatus 100 or is used as a memory area for various operations performed by the display apparatus 100, read-only memory (ROM) 182 that stores a control program for controlling the display apparatus 100, and a processor 183.

The processor 183 may include a graphics processing unit for performing video graphics processing. The processor 183 may be implemented by using a System On Chip (SoC) into which a core and a GPU are incorporated. The processor

183 may include a single core processor, a dual core processor, a triple core processor, a quad core processor, or the like.

The processor 183 may include a plurality of processors. For example, the processor 183 may be implemented by using a main processor and a sub-processor operating in a sleep mode.

A graphics processor 184 may generate a screen image including various objects, such as an icon, an image, and a text, by using, for example, an arithmetic unit and a rendering unit. The arithmetic unit may calculate attribute values, such as a coordinate value, a shape, a size, a color, and the like, with which each object is to be displayed according to layouts of the screen image, based on the user interaction sensed by the sensor 160. The rendering unit may generate screen images of various layouts including objects, based on the attribute values calculated by the arithmetic unit. The screen images generated by the rendering unit are displayed on a display area of the display 115.

First through n-th interfaces 185-1 through 185-*n* may be connected to the above-described components of the display apparatus 100. One of the first through n-th interfaces 185-1 through 185-*n* may be a network interface that is connected to an external apparatus via a network.

The RAM 181, the ROM 182, the processor 183, the graphics processor 184, and the first through n-th interfaces 185-1 through 185-*n* may be connected to each other via an internal bus 186.

The term "a controller of a display apparatus" used in the present exemplary embodiment includes the processor 183, the ROM 182, and the RAM 181.

The controller 180 may control at least one selected from the light receiver 163 receiving light output by the control device 200, a panel key located on a lateral or rear surface of the display apparatus 100, the microphone 161 receiving a user's voice, and the camera 162 receiving a user's motion, to receive a user input corresponding to user setting for changing and providing the area of at least one of the plurality of windows included in the multi-window screen image that is provided to the display 115. The user input may be described in various terms such as a user manipulation, a user command, and an input command.

According to an exemplary embodiment, the controller 180 may control the display 115 to change the area of at least one of the plurality of windows based on a user's setting and provide the at least one window, the area of which is changed.

According to an exemplary embodiment, the controller 180 may control the display 115 to perform at least one from among changing a size of the at least one window, changing a location of the at least one window, and providing a visual effect to the at least one window, in order to change the area of the at least one window.

According to an exemplary embodiment, instead of changing the size or location of the at least one window, the controller 180 may control the display 115 to change the size or location of a window other than the at least one window.

According to an exemplary embodiment, the controller 180 may control the display 115 to change the area of the at least one window, based on a signal indicating that content of a preferred channel registered by the user is reproduced on the at least one window.

According to an exemplary embodiment, the controller 180 may control the display 115 to change the size of the at least one window, based on a signal indicating that content of which viewing reservation or reproduction reservation has been registered by the user is reproduced on the at least one window.

According to an exemplary embodiment, the controller 180 may check the identity of a user and control the display 115 to change the area of at least one of the plurality of windows based on the user setting corresponding to the checked or verified identity of the user. To check the identity of the user, the controller 180 may photograph the user and analyze an image of the photographed user.

According to an exemplary embodiment, the controller 180 may control the display 115 to change and provide the area of at least one of the plurality of windows based on content that is reproduced on the at least one window.

According to an exemplary embodiment, the controller 180 may control the display 115 to change the size of the at least one window based on the attributes of content that is reproduced on the at least one window.

According to an exemplary embodiment, the controller 180 may control the display 115 to change the size of the at least one window from a first size to a second size based on a signal indicating that the attribute of content that is reproduced on the at least one window having the first size has a specific value, and to restore the size of the at least one window to the first size based on a signal representing that the attribute of the content does not have the specific value.

According to an exemplary embodiment, the controller 180 may control the display 115 to reduce the size of the at least one window and increase the sizes of windows other than the at least one window, based on a signal indicating that the attribute of content that is reproduced on the at least one window is an advertisement.

According to an exemplary embodiment, the controller 180 may control the display 115 to change the area of the at least one window based on a signal indicating that content that is reproduced on the at least one window is being recorded or is transmitted to an external apparatus.

According to an exemplary embodiment, the controller 180 may control the display 115 to change the size of an application item that is output in association with at least one window of which size is changed.

It will be easily understood by one of ordinary skill in the arthat the structure and operation of the controller 180 may be variously implemented according to exemplary embodiments.

The storage 190 may store various data, programs, or applications for driving and controlling the display apparatus 100 under the control of the controller 180. The storage 190 may store input/output signals or data corresponding to driving of the video processor 110, the display 115, the audio processor 120, the audio output interface 125, the power supplier 130, the tuner 140, the communicator 150, the sensor 160, and the input/output interface 170. The storage 190 may store a control program for controlling the display apparatus 100 and the controller 180, an application initially provided by a manufacturer or downloaded from outside the display apparatus 100, a graphical user interface (GUI) associated with the application, objects (for example, an image text, an icon, and a button) for providing the GUI, user information, a document, databases, or related pieces of data.

According to an exemplary embodiment, the term "storage" includes the storage 190, the ROM 182 and the RAM 181 of the controller 180, or a memory card (e.g., a micro SD card or a USB memory) mounted in the display apparatus 100. The storage 190 may include a non-volatile memory, a volatile memory, a hard disk drive (HDD), or a solid state drive (SSD).

The storage 190 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB, which are not shown. These modules and the DBs of the storage 190, which are not shown, may be implemented as software in order to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (for example, Bluetooth) connected external apparatus. The controller 180 may perform these functions by using the software stored in the storage 190.

According to an exemplary embodiment, the storage 190 may store user setting information received via the light receiver 163, the panel key, the microphone 161, or the camera 162. The user setting information may include user preferred channel setting information, viewing reservation setting information, and reproduction reservation setting information. The user setting information may also include information that is selected by a user in order to determine the size or location of at least one of a plurality of windows that constitute a multi-window screen image or to provide a visual effect to the at least one window.

According to an exemplary embodiment, the storage 190 may store user identification information received via the light receiver 163, the panel key, the microphone 161, or the camera 162. The user identification information may include text information such as the identity (ID) or password (PW) of a user, information such as the face of the user, and information such as the voice of the user.

The storage 190 may store a moving picture or an image corresponding to visual feedback.

The storage 190 may store a sound corresponding to auditory feedback.

The display apparatus 100 having the display 115 may be electrically connected to an external apparatus (for example, a set-top box) having a tuner. For example, the display apparatus 100 may be implemented by using an analog TV, a digital TV, a 3D TV, a smart TV, an LED TV, an OLED TV, a plasma TV, a monitor, or the like, but it will be easily understood by one of ordinary skill in the art that exemplary embodiments are not limited thereto.

The display apparatus 100 may include a sensor (for example, an illumination sensor or a temperature sensor) for detecting an internal or external state of the display apparatus 100.

According to the performance of the display apparatus 100, in some exemplary embodiments at least one component may be added to the components (for example, the components 110-190) of the display apparatus 100 of FIG. 3, or at least one of the components (for example, the components 110-190) of the display apparatus 100 of FIG. 3 may be deleted. It will also be easily understood by one of ordinary skill in the art that the locations of the components (for example, the components 110-190) of the display apparatus 100 of FIG. 3 may be changed according to the performance or structure of the display apparatus 100.

Figure 4:
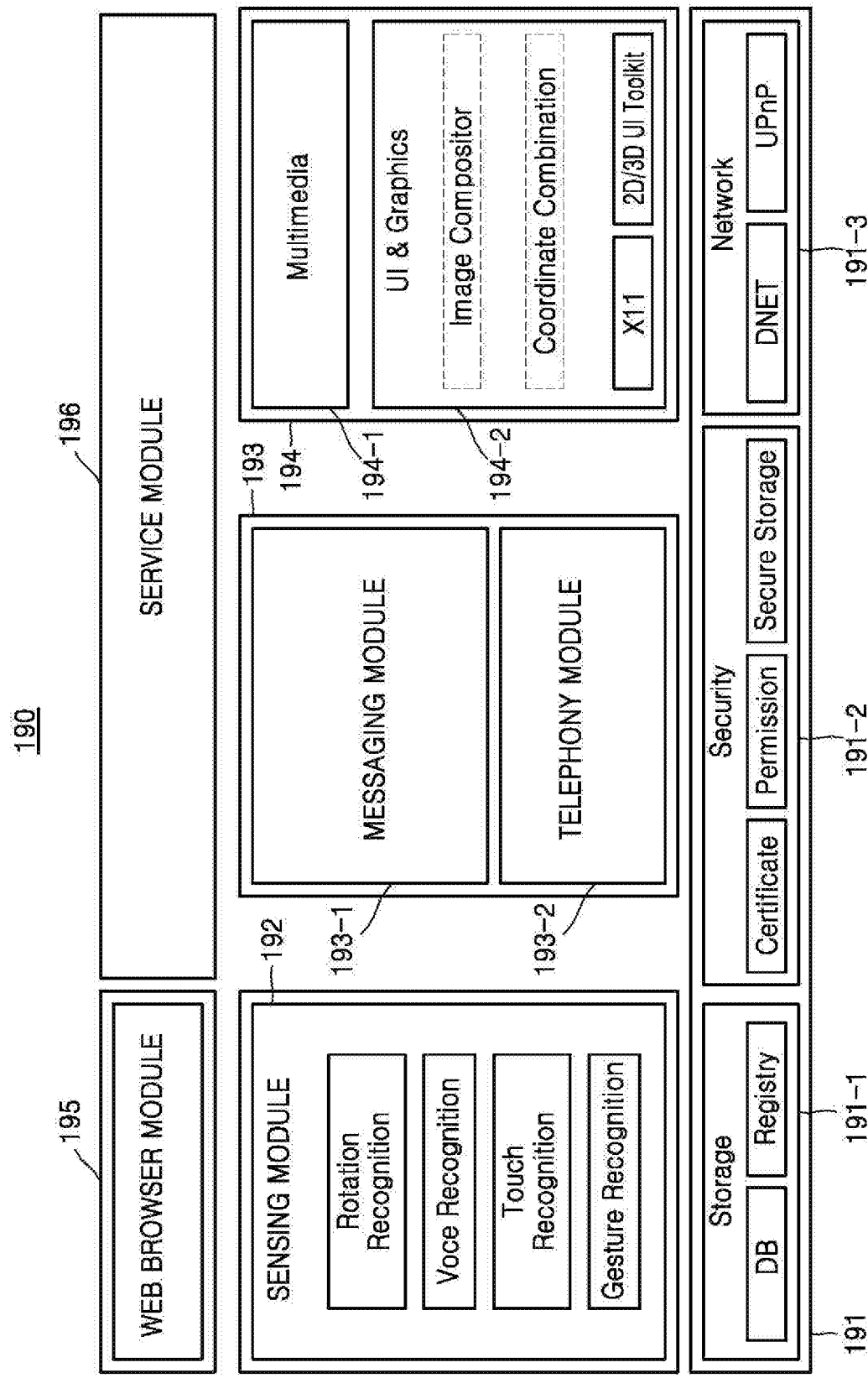
FIG. 4 is a block diagram of a software structure stored in a storage included in the display apparatus.

FIG. 4 is a block diagram of a software structure stored in the storage 190, according to exemplary embodiments.

Referring to FIG. 4, the storage 190 may store software including a base module 191, a sensing module 192, a communication module 193, a presentation module 194, a web browser module 195, and a service module 196.

The base module 191 may be a base module which processes a signal that is received from each hardware element included in the display apparatus 100 and transmits a processed signal to an upper layer module. The base module 191 may include a storage module 191-1, a security module 191-2, and a network module 191-3. The storage module 191-1 may be a program module which manages a DB or a registry. The processor 183 may access the DB included in the storage 190 by using the storage module 191-1 and read various pieces of data from the DB. The security module 191-2 may be a program module which supports certification, permission, secure storage, and the like of hardware. The network module 191-3 supports network connection, and includes a DNET module, an UPnP module, or the like.

The sensing module 192 may collect information from various sensors and analyze and manage the collected information. The sensing module 192 may include a head direction recognition module, a face recognition module, a voice recognition module, a motion recognition module, an NFC recognition module, and the like.

The communication module 193 may perform communication with an external source. The communication module 193 may include a messaging module 193-1, such as a messenger program, a short message service (SMS) & multimedia message service (MMS) program, or an e-mail program, and a telephony module 193-2 including a call info aggregator program module, a VoIP module, or the like.

The presentation module 194 may construct a display screen image. The presentation module 194 may include a multimedia module 194-1 for reproducing and outputting multimedia content, and a UI rendering module 194-2 rendering a UI and performing graphics processing. The multimedia module 194-1 may include a player module, a camcorder module, a sound processing module, and the like. Accordingly, the multimedia module 194-1 produces and reproduces a screen image and a sound by reproducing various types of multimedia content. The UI rendering module 194-2 may include an image composition module that composes an image, a coordinate combination module which combines coordinates on a screen on which an image is to be displayed, an X11 module which receives various events from hardware, and a 2D/3D UI toolkit which provides a tool for constructing a 2D or 3D UI.

The web browser module 195 may access a web server by performing web browsing. The web browser module 195 may include various modules, such as a web view module which constructs a web page, a download agent module which performs downloading, a bookmark module, and a Webkit module.

The service module 196 may include various applications for providing various services. In detail, the service module 196 may include various program modules, such as a social networking service (SNS) program, a content reproduction program, a game program, an electronic book program, a calendar program, an alarm management program, and other Widgets.

FIG. 4 illustrates various program modules, but, in some exemplary embodiments, some of the illustrated program modules may be omitted or modified, or other program modules may be added to the illustrated various program modules, according to the type and characteristics of the display apparatus 100. For example, a location-based module for supporting a location-based service by interacting with hardware, such as a global positioning system (GPS) chip, may be further included in the storage 190.

Figure 5A:
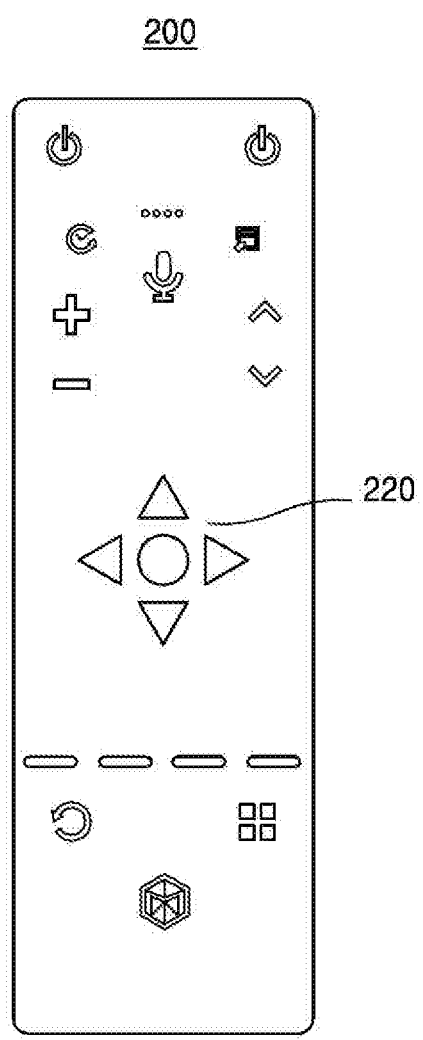
FIGS. 5A-5C illustrate embodiments of a control device illustrated in FIG. 1.
Figure 5B:
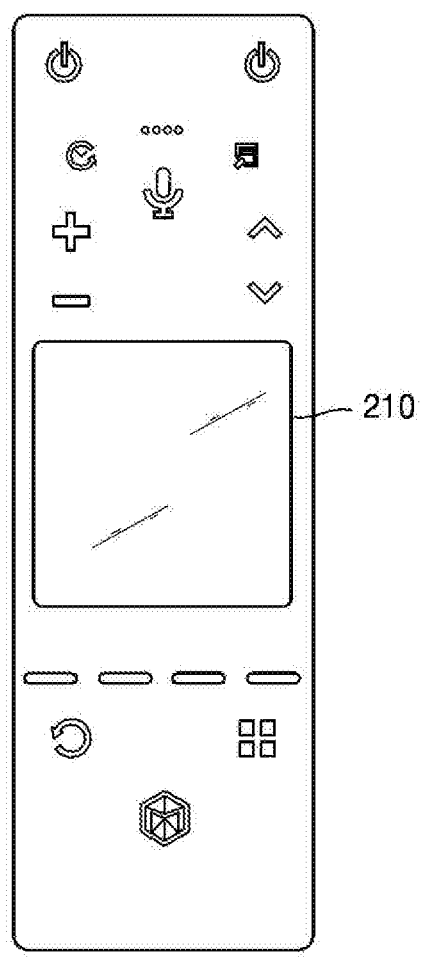
Figure 5C:
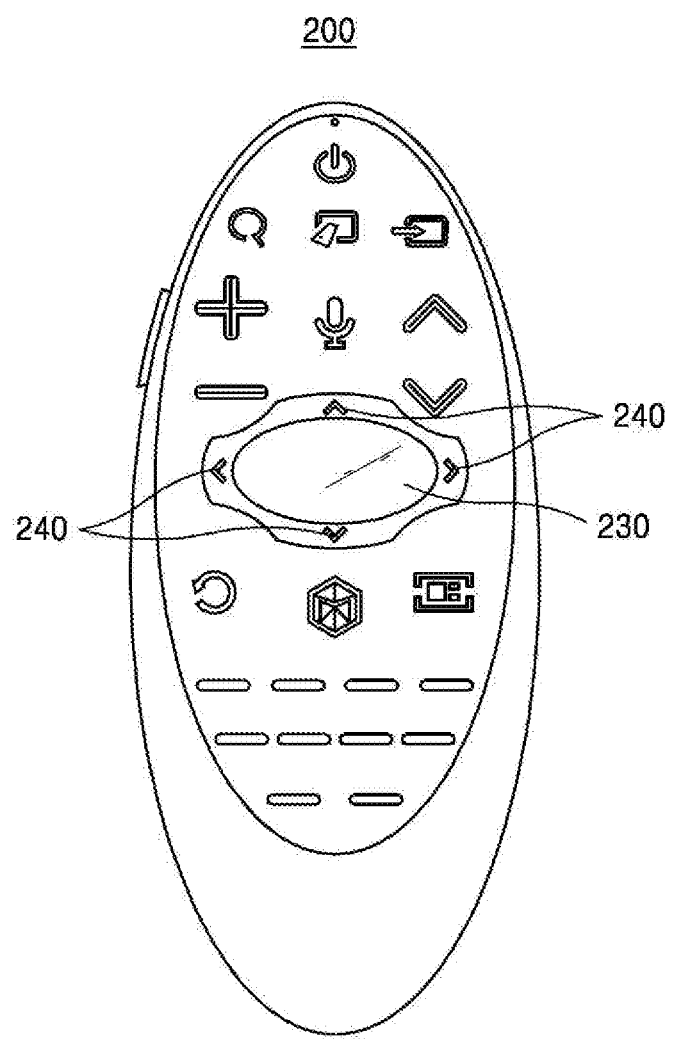

FIGS. 5A-5C illustrate exemplary embodiments of the control device 200 of FIG. 1.

Referring to FIG. 5A, an exemplary embodiment of the control device 200 includes four direction buttons or four direction keys 220. The four direction buttons or four direction keys 220 may be used to control a window, an area, an application, or an item displayed on the display 115. In other words, the sensor 160 may sense a user interaction of pressing one of the four direction buttons or four direction keys 220 and thus control the display 115. Four direction buttons or keys 220 may be used to indicate, for example, up, down, left, and right movements. It will be understood by one of ordinary skill in the art that the control device 200 may include two direction keys or two direction buttons instead of four direction buttons or four direction keys, or any desired number of direction buttons or direction keys.

Referring to FIG. 5B, another exemplary embodiment of the control device 200 may include a touch pad 210 instead of the four direction buttons or four direction keys 220.

Accordingly, the sensor 160 may sense a user interaction of performing dragging, touching, or flipping via the touch pad 210 of the control device 200. The display apparatus 100 may be controlled according to the type of sensed user interaction (for example, a direction in which a drag command is input, or a time when a touch command is input).

Referring to FIG. 5C, another exemplary embodiment of the control device 200 may be implemented by using a pointing device including any desired combination of four direction buttons or keys 240 and a touch pad 230. In other words, when the control device 200 is implemented by using a pointing device, the function of the display apparatus 100 may be controlled according to, for example, the direction or angle in or at which the control device 200 is inclined.

According to an exemplary embodiment, a user may change the size or location of at least one of a plurality of windows that constitute a multi-window screen image, or provide a visual effect to the at least one window, by using direction keys, a touch pad, a pointing function, or the like of the control device 200.

Moreover, according to an exemplary embodiment, the user may select an input for a preferred channel setting, an input for a viewing reservation setting, and an input for a reproduction reservation setting, by using the direction keys, the touch pad, or the pointing function of the control device 200.

Figure 6:
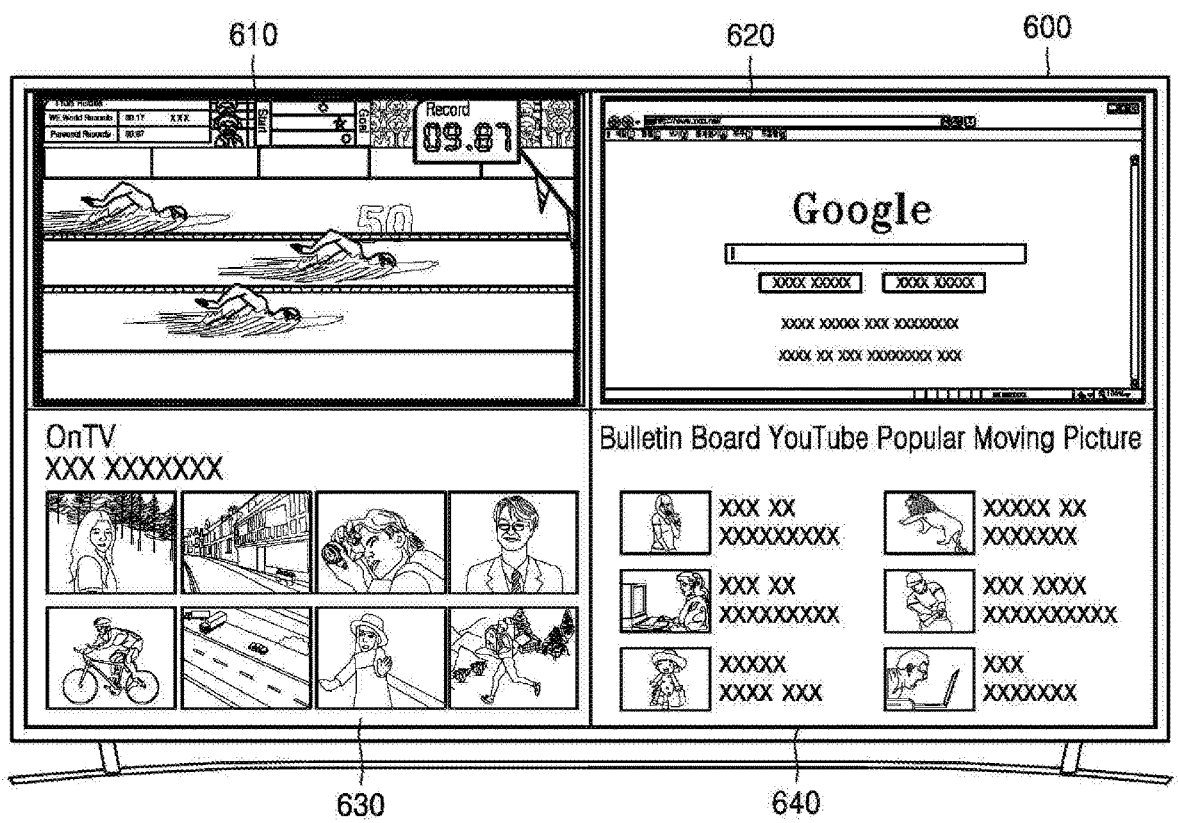
FIG. 6 illustrates an example of a multi-window screen image including a plurality of windows.

FIG. 6 illustrates an example of a multi-window screen image 600 including a plurality of windows.

Referring to FIG. 6, the multi-window screen image 600 provided to the display 115 includes four windows, namely, a window 610, a window 620, a window 630, and a window 640. A window used herein may refer to each partial screen image when the screen image of the display 115 is divided into a plurality of areas, and may be referred to using various terms such as a screen part and a sub-screen.

Although the multi-window screen image 600 includes four windows in FIG. 6, exemplary embodiments of the multi-window screen 600 are not limited thereto. If a screen image is divided into a plurality of windows and thus a multi-window screen image is used, the multi-window screen image may include any number of windows. For example, the display apparatus 200 may include any number of windows, such as two windows, three windows, four windows, or eight windows, in a multi-window screen image.

The display apparatus 100 may use the windows to reproduce different applications or different pieces of content. In other words, the display apparatus 100 may independently use the windows to display a TV broadcasting program received via the tuner 140, output a web browsing screen image by using data received via the communicator 150, or output data received via the input/output interface 170 or the storage 190.

In the example of FIG. 6, the display apparatus 100 outputs a TV broadcasting program via the window 610, provides an Internet web browsing screen image via the window 620, outputs via the window 630 information about a broadcasting program that is currently being broadcast, and provides a YouTube screen image via the window 640.

The display apparatus 100 may change the area of each window of the multi-window screen image 600. A change in the area of a window may include a change in the size of the window, a change in the location of the window, or provision of a visual effect to the window.

The display apparatus 100 may perform the change in the size of each window of the multi-window screen image 600, the change in the location thereof or the provision of a visual effect thereto, based on a user input received via the control device 200. For example, if a preferred channel is set by a user or viewing reservation or reproduction reservation is set, when a program of the preferred channel set by the user, a view reserved program, or a reproduction-reserved program is displayed, the display apparatus 100 may change the area of a window on which the program of the preferred channel set by the user, the view reserved program, or the reproduction-reserved program is displayed.

The display apparatus 100 may perform the change in the size of each window of the multi-window screen image 600, the change in the location thereof or the provision of a visual effect thereto, based on internal settings of the display apparatus 100. For example, the display apparatus 100 may change the area of at least one window of a multi-window screen image, based on an attribute of content that is output on the at least one window.

Figure 7:
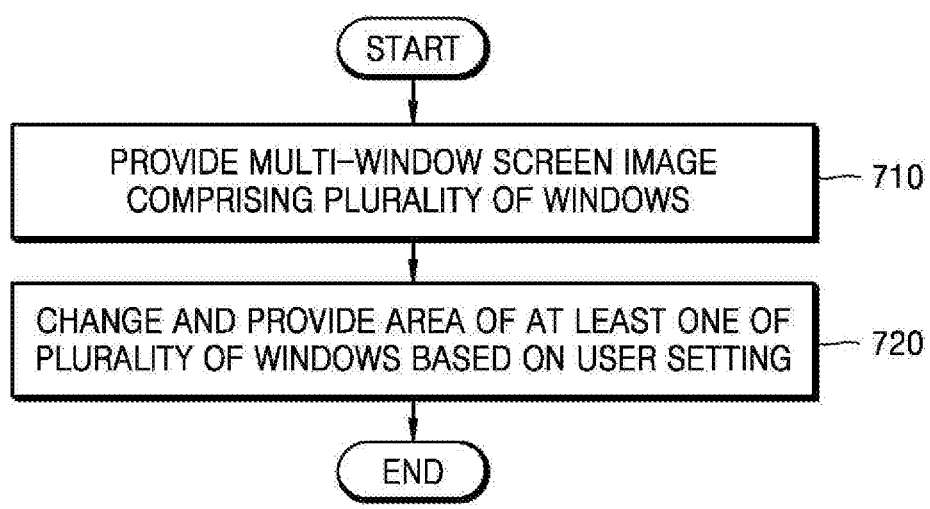
FIG. 7 is a flowchart of a method of operating the display apparatus, according to an exemplary embodiment.

FIG. 7 is a flowchart of a method 700 of operating the display apparatus 100, according to an exemplary embodiment.

Referring to FIG. 7, in operation 710, the display apparatus 100 provides a multi-window screen image including a plurality of windows.

Figure 8A:
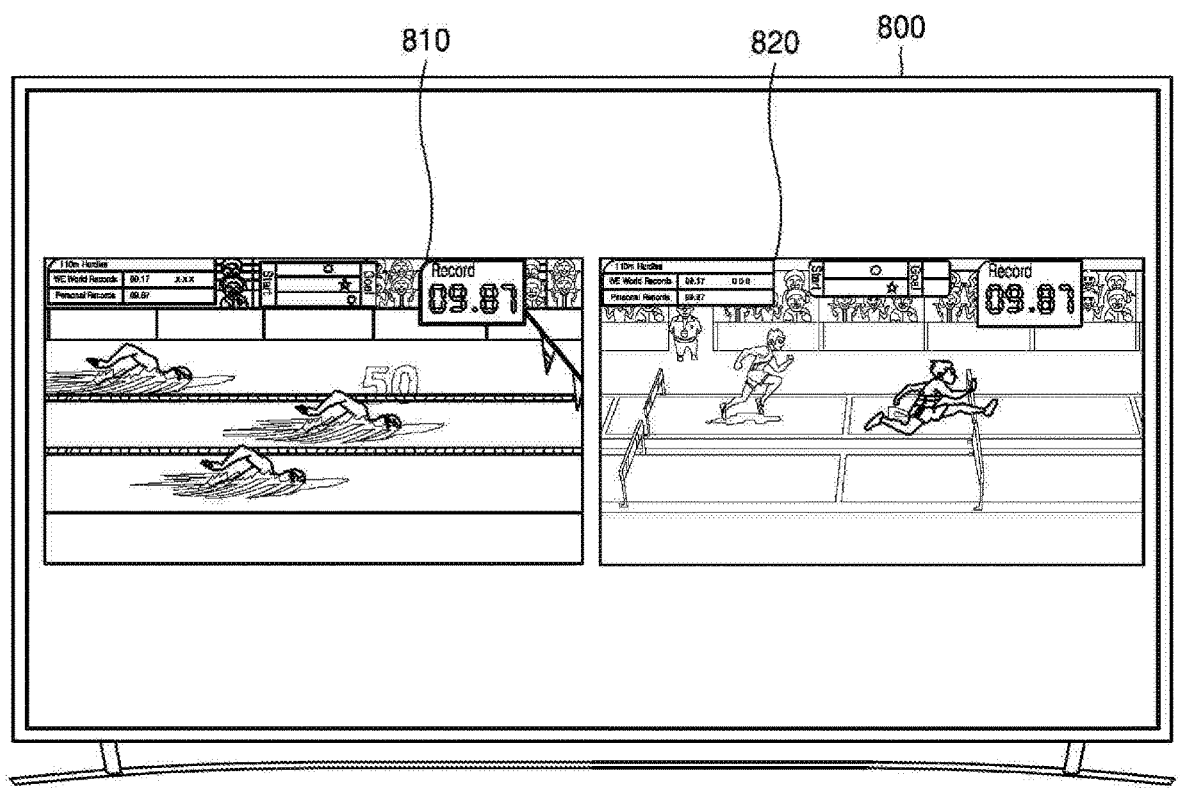
FIG. 8A illustrates an example of a multi-window screen image according to an exemplary embodiment.

As illustrated in FIG. 8A, the display apparatus 100 may provide a multi-window screen image including two windows having the same sizes.

Referring to FIG. 8A, the display apparatus 100 provides a multi-window screen image 800 including two windows, namely, a window 810 and a window 820. For example, content received via the Internet may be output via the window 810, and TV broadcasting program content may be output via the window 820.

The controller 180 of the display apparatus 100 may control content received via the communicator 150 to be output on the window 810 of the multi-window screen image 800 of the display 115. The controller 180 of the display apparatus 100 may control TV broadcasting program content received via the tuner 140 to be output on the window 820 of the multi-window screen image 800 of the display 115.

The number of windows that are to constitute the multi-window screen image 800 may be provided by the display 115 based on information preset in the storage 190 under the control of the controller 180 or based on a user's setting information received via the communicator 150 or the sensor 160 under the control of the controller 180.

Moreover, a source from which content is to be reproduced on each window of the multi-window screen image 800 may be provided by the display 115 based on information pre-stored in the storage 190 under the control of the controller 180 or based on user's setting information received via the communicator 150 or the sensor 160 under the control of the controller 180.

Referring back to FIG. 7, in operation 720, the display apparatus 100 may change and provide the area of at least one of the plurality of windows based on a user's setting.

Examples of the user setting may include a preferred channel setting, a viewing reservation setting, and a reproduction reservation setting by a user.

According to an exemplary embodiment, the controller 100 may change the area of the at least one window, based on a signal indicating that content of a preferred channel registered by the user is reproduced on the at least one window.

According to an exemplary embodiment, the user may set a preferred channel that the user desires, in the display apparatus 100 while using the display apparatus 100. The controller 180 of the display apparatus 100 may store information about a user preferred channel received via the communicator 150 or the sensor 160 in the storage 190, and control output of the display 115 by using the information about the user preferred channel stored in the storage 190.

According to an exemplary embodiment, when a multi-window screen image including a plurality of windows is provided to the display 115 and a signal indicating that a program of a user preferred channel corresponding to the information about the user preferred channel stored in the storage 190 is displayed on at least one of the plurality of windows is received, the controller 180 may change the area of the at least one window on which the user preferred channel program is output.

According to an exemplary embodiment, the controller 180 may receive the signal indicating that the program of the user preferred channel corresponding to the user preferred channel information is displayed, via the communicator 150 or the sensor 160.

According to an exemplary embodiment, when a user selects a user preferred channel from among TV broadcasting channels by using the control device 200, the controller 180 may receive a signal indicating that a program of the selected user preference channel is displayed.

According to an exemplary embodiment, when a program of a user preferred channel corresponding to user preferred channel information is found while a user is performing, for example, channel zapping, channel surfing, or channel browsing with respect to TV broadcasting programs, the controller 180 may receive a signal indicating that the program of the user preferred channel is found. The user may search for the user preferred channel program or select the user preferred channel program by using the four direction keys 220 of the control device 200 of FIG. 5A, the touch pad 210 of the control device 200 of FIG. 5B, or the control device 200 of FIG. 5C having a pointing function.

According to an exemplary embodiment, the display apparatus 100 may change the area of at least one window, based on a signal indicating that content of which a reserved viewing has been registered by a user is reproduced on the at least one window.

For example, the user may set viewing reservation, which enables a user to view a program of a desired channel at a desired time, in the display apparatus 100, while using the display apparatus 200. The controller 180 of the display apparatus 100 may store information about viewing reservation received via the communicator 150 or the sensor 160 in the storage 190, and control output of the display 115 by using the information about the viewing reservation stored in the storage 190.

According to an exemplary embodiment, when a multi-window screen image including a plurality of windows is provided to the display 115 and a signal indicating that a view reserved program is output at a time corresponding to the information about the viewing reservation stored in the storage 190 on at least one of the plurality of windows is received or the view-reserved time stored in the storage 190 arrives, the controller 180 may change the area of the at least one window on which the view reserved program is output.

According to an exemplary embodiment, the display apparatus 100 may change the area of at least one window, based on a signal indicating that content of which reserved reproduction has been registered by a user is reproduced on the at least one window. The signal indicating that content of which reserved reproduction has been registered by the user is reproduced may include, for example, information about the time for which reserved reproduction is registered.

For example, the user may set reproduction reservation, which enables a user to reproduce desired content at a desired time, in the display apparatus 100, while using the display apparatus 200. The content of which reproduction is reserved may be received via the input/output interface 170 or may be stored in the storage 190. The controller 180 of the display apparatus 100 may store information about reproduction reservation received via the communicator 150 or the sensor 160 in the storage 190, and control output of the display 115 by using the information about the reproduction reservation stored in the storage 190.

According to an exemplary embodiment, when a multi-window screen image including a plurality of windows is provided to the display 115 and a signal indicating that reproduction-reserved content is output at a time corresponding to the information about the reproduction reservation stored in the storage 190 on at least one of the plurality of windows is received, the controller 180 may change the area of the at least one window on which the reproduction-reserved content is output. In other words, when a multi-window screen image including a plurality of windows is provided to the display 115, and a signal is received indicating that reproduction-reserved content is output on at least one of the plurality of windows at a time corresponding to the reproduction reservation, the controller 180 may change the area of the at least one window on which the reproduction-reserved content is output.

Figure 8B:
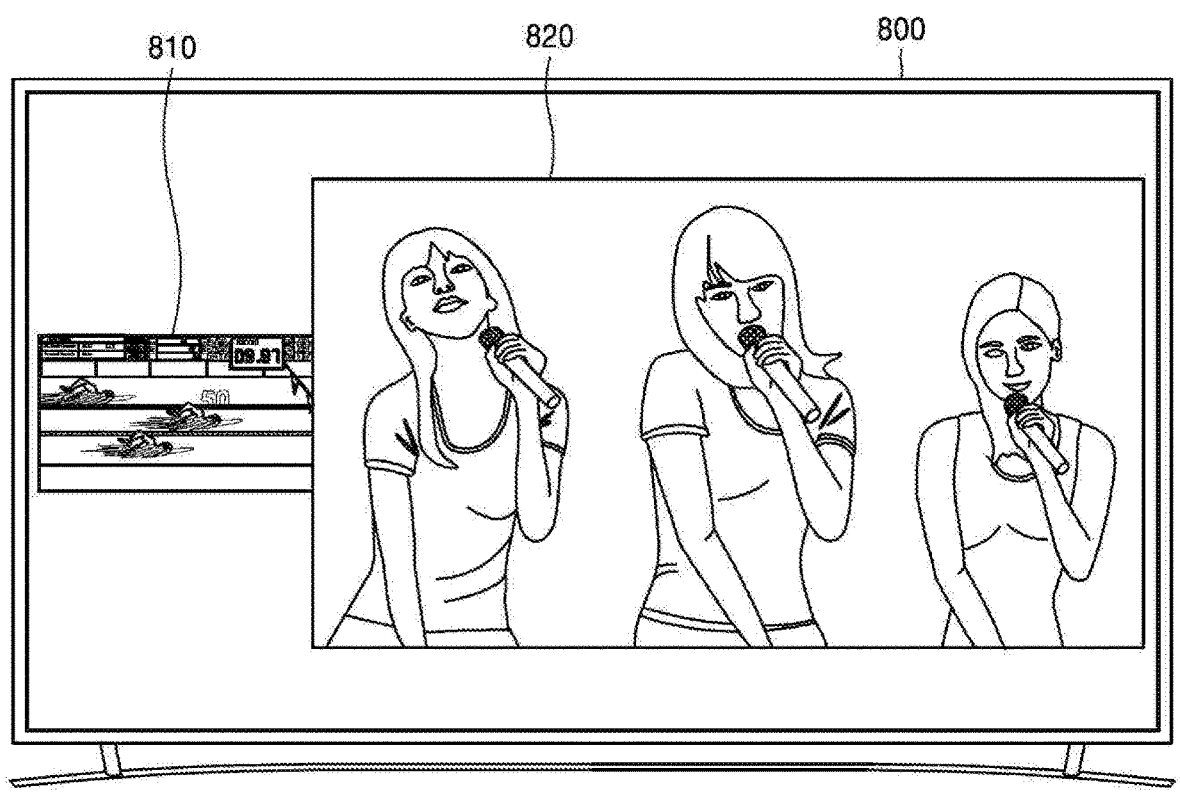
FIGS. 8B-9C illustrate examples of changing the size of a window according to exemplary embodiments.

Referring back to FIG. 8A, when content received via the Internet is output on the window 810 of the multi-window screen image 800, TV broadcasting program content is output on the window 820 thereof, and then a program corresponding to a user preferred channel is selected on the window 820 or found via channel zapping, the controller 180 may change the area of the window 820 while outputting a program corresponding to the user preferred channel on the window 820, as illustrated in FIG. 8B. When the program corresponding to the user preferred channel is found via channel zapping, the controller 180 may change the area of the window 820 only during a predetermined searching period. When the searching for the user preferred channel is concluded, the controller 180 may restore the area of the window 820 back to the original shape or size.

For example, while content received via the Internet is output on the window 810 of the multi-window screen image 800, and TV broadcasting program content is output on the window 820 as illustrated in FIG. 8A, if a program of which viewing has been reserved by a user begins to be output on the window 820, the controller 180 may change the area of the window 820 while outputting the program of which viewing reservation has been registered, as illustrated in FIG. 8B.

For example, while content received via the Internet is output on the window 810 of the multi-window screen image 800, and TV broadcasting program content is output on the window 820 thereof, as illustrated in FIG. 8A, if the reserved reproduction content begins to be output on the window 820, the controller 180 may change the area of the window 820 while outputting the reserved reproduction content, as illustrated in FIG. 8B. Changing the area of a window may include a size change of the window, a location change thereof, and provision of a visual effect thereto.

Examples of changing the area of a window will now be described with reference to FIGS. 8B-12B. An example of changing the size of a window will be described with reference to FIGS. 8B-8C and 9A-9C, an example of changing the location of a window will be described with reference to FIGS. 10 and 11A-11D, and an example of providing a visual effect to a window will be described with reference to FIGS. 12A and 12B.

Referring to FIG. 8B, when a program corresponding to a user preferred channel, a view reserved program, or reproduction-reserved content is output on the window 820 of the multi-window screen image 800, the controller 180 may control the display 115 to magnify the size of the window 820 and display a magnified window 820. In this case, the size of the window 810 other than the magnified window 820 may be reduced in inverse proportion to the magnification of the magnified window 820.

Figure 8C:
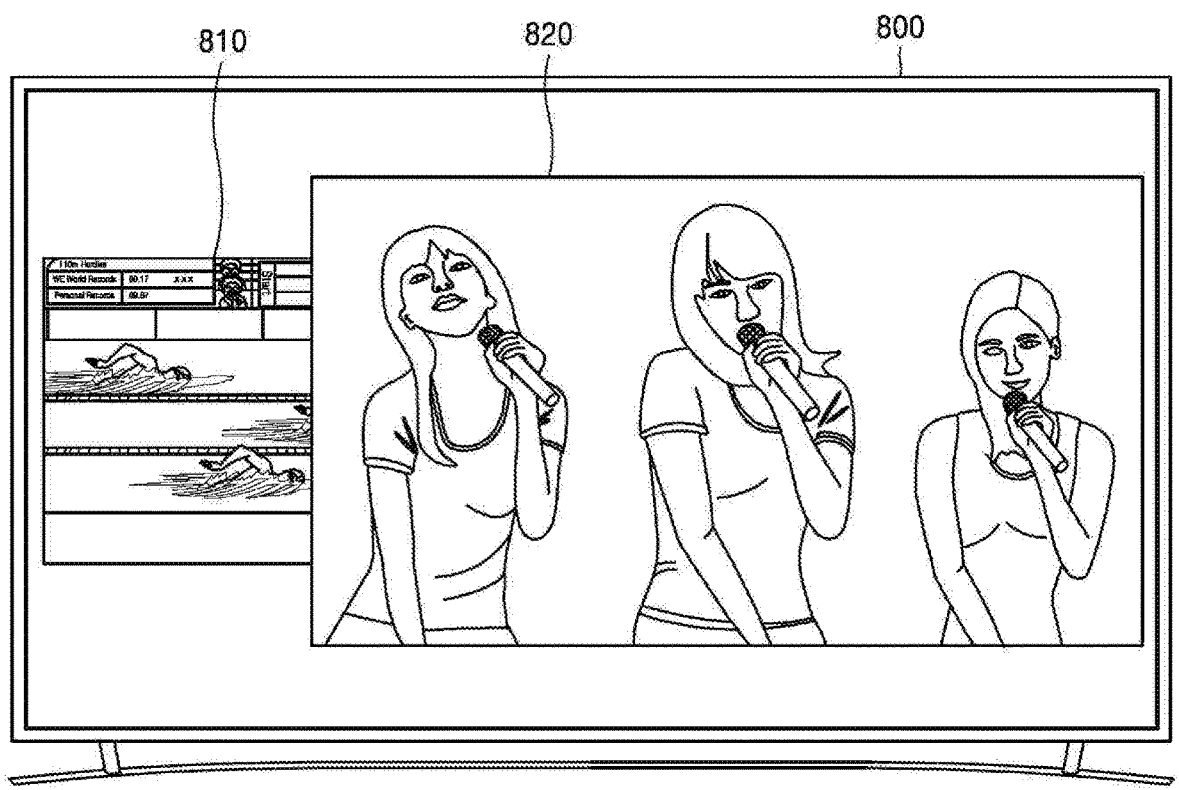

FIG. 8C illustrates an example in which the size of a window other than a magnified window is fixed.

Referring to FIG. 8C, when a program corresponding to a user preference channel, a view reserved program, or reproduction-reserved content is output on the window 820 of the multi-window screen image 800, the controller 180 may control the display 115 to magnify the size of the window 820 and fix the size of the window 810 other than the magnified window 820. In this case, because the size of the window 810 is fixed and only the size of the window 820 is magnified, the window 820 may cover a portion of the window 810.

Figure 9A:
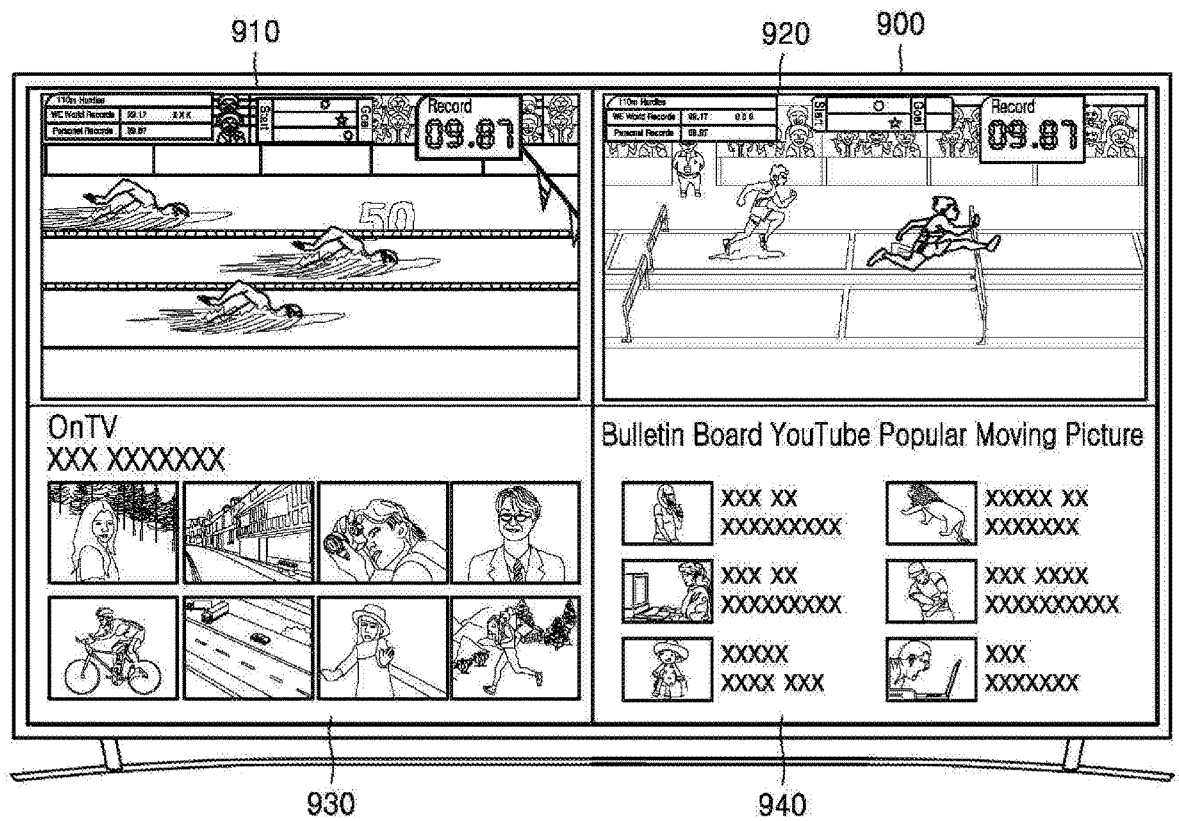

FIG. 9A illustrates an example in which a multi-window screen image 900 includes 4 windows 910, 920, 930, and 940.

Referring to FIG. 9A, content received via the Internet is output on the window 910, a TV broadcasting program is output on the window 920, broadcasting channel information is output on the window 930, and a YouTube screen image is output on the window 940.

Figure 9B:
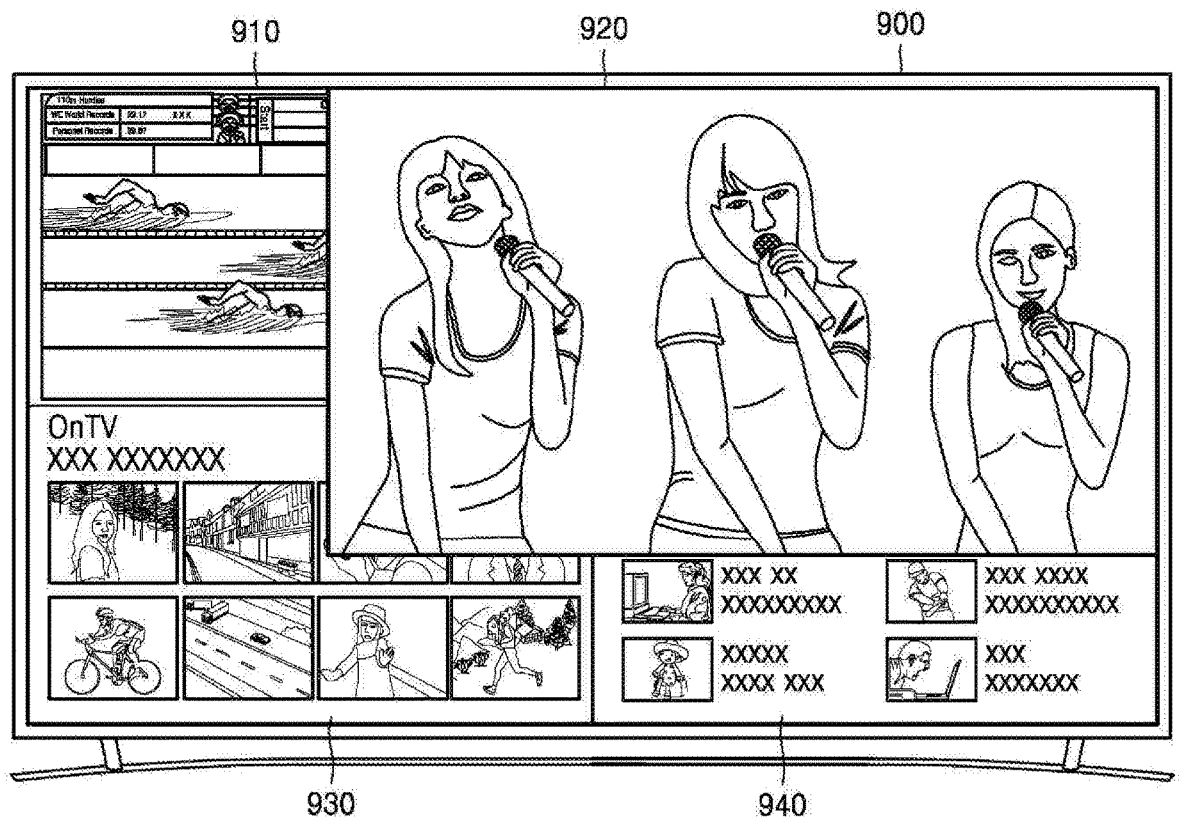

When the multi-window screen image 900 is output as illustrated in FIG. 9A and then a program registered as a preferred channel by a user is output on the window 920, the controller 180 may magnify the window 920 while outputting the program registered as a preferred channel as illustrated in FIG. 9B. The controller 180 may control the display 115 to fix the sizes of the windows 910, 930, and 940 other than the window 920 such that the window 920 is displayed while covering the windows 910, 930, and 940.

Figure 9C:
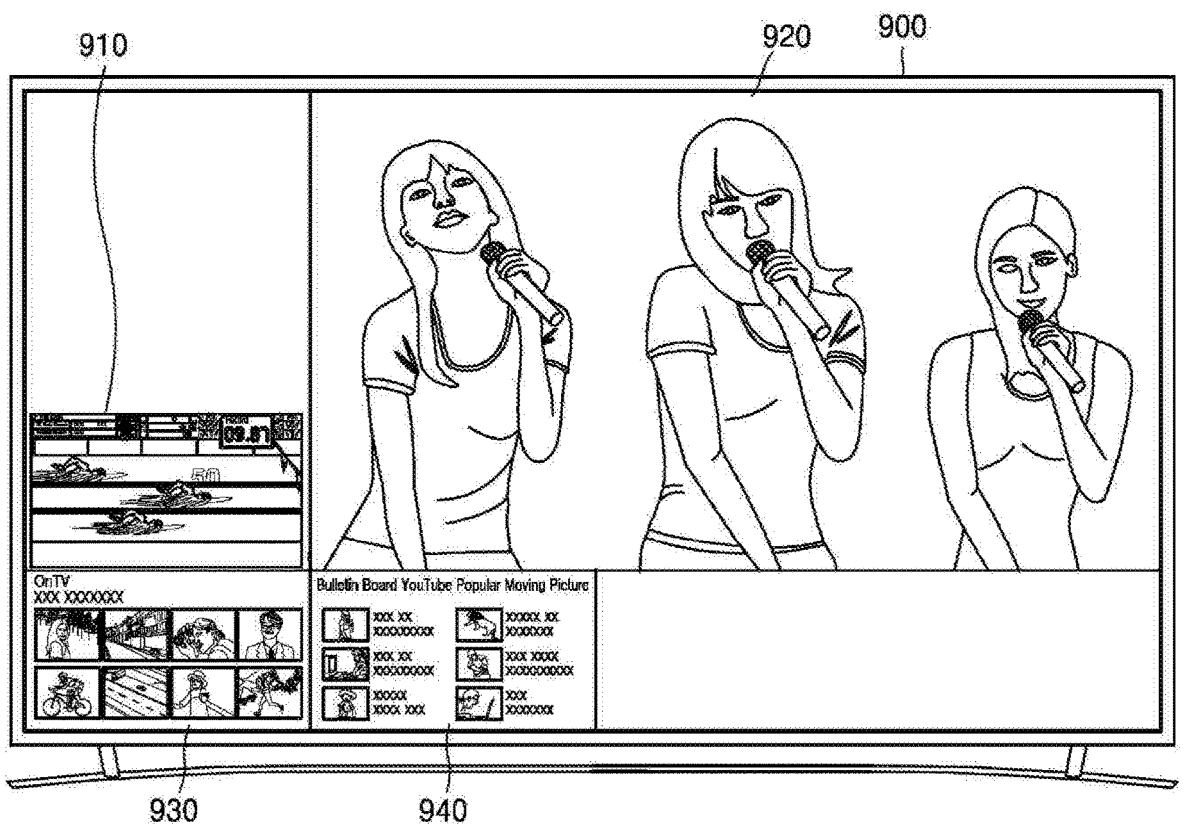

FIG. 9C illustrates an example in which the sizes of the windows 910, 930, and 940 other than the magnified window 920 are reduced such that the window 920 does not overlap the windows 910, 930, and 940.

Figure 10:
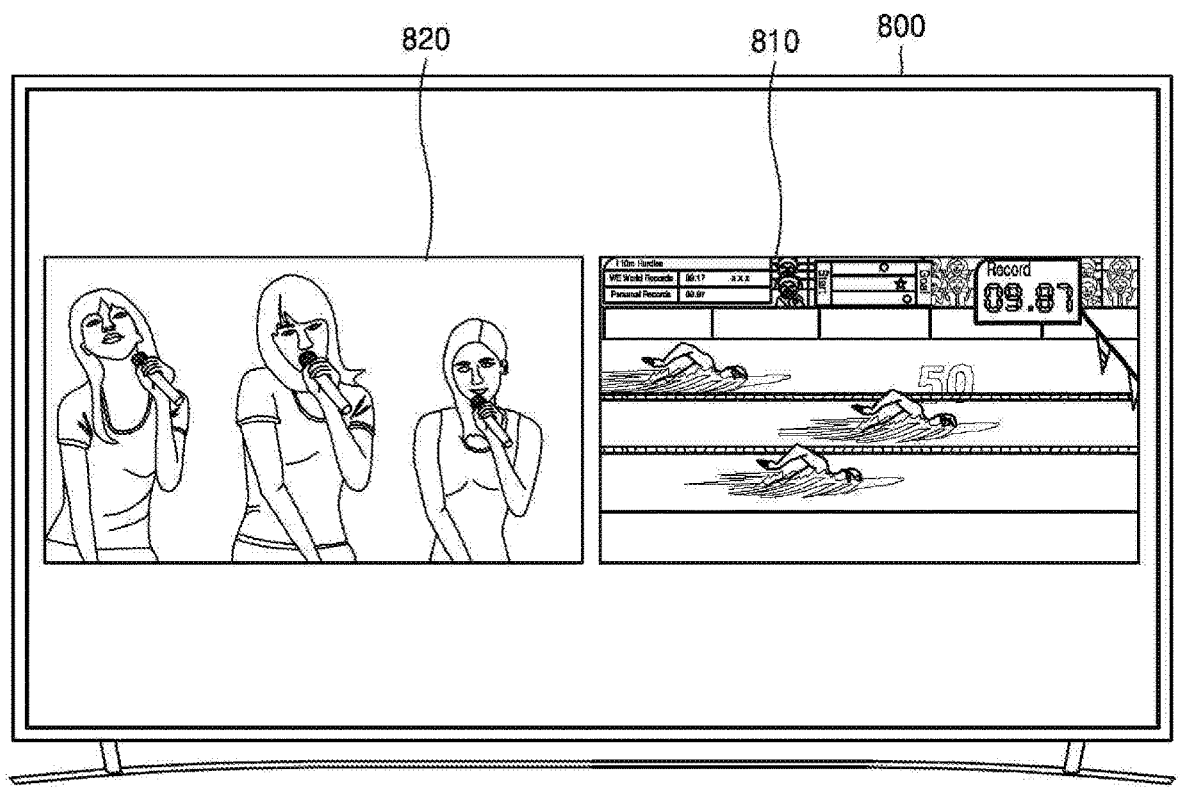
FIGS. 10 and 11A-11D illustrate examples of changing the location of a window according to exemplary embodiments.

FIG. 10 illustrates another example of changing the area of a window, that is, an example of changing the location of a window.

For example, when a user views a program of his or her preferred channel, the user may want to view the preferred channel program as a large screen image by magnifying a window on which the preferred channel program is output, but there may also be a location of the window, where the user desires to view the preferred channel program. For example, the user may want to view the preferred channel program on the left side of the entire screen of the display 115.

Referring to FIG. 10, when a program of a channel preferred by a user is output, the controller 180 may control the display 115 to locate the window 820, on which the preferred channel program is output, on the left side of the screen and to locate the window 810 on the right side thereof. In other exemplary embodiments, the user may want to view the preferred channel on the right side of the screen, or any other desired location, and the controller 180 may therefore control the display 115 to locate the window 820 at the desired location on the screen.

Figure 11A:
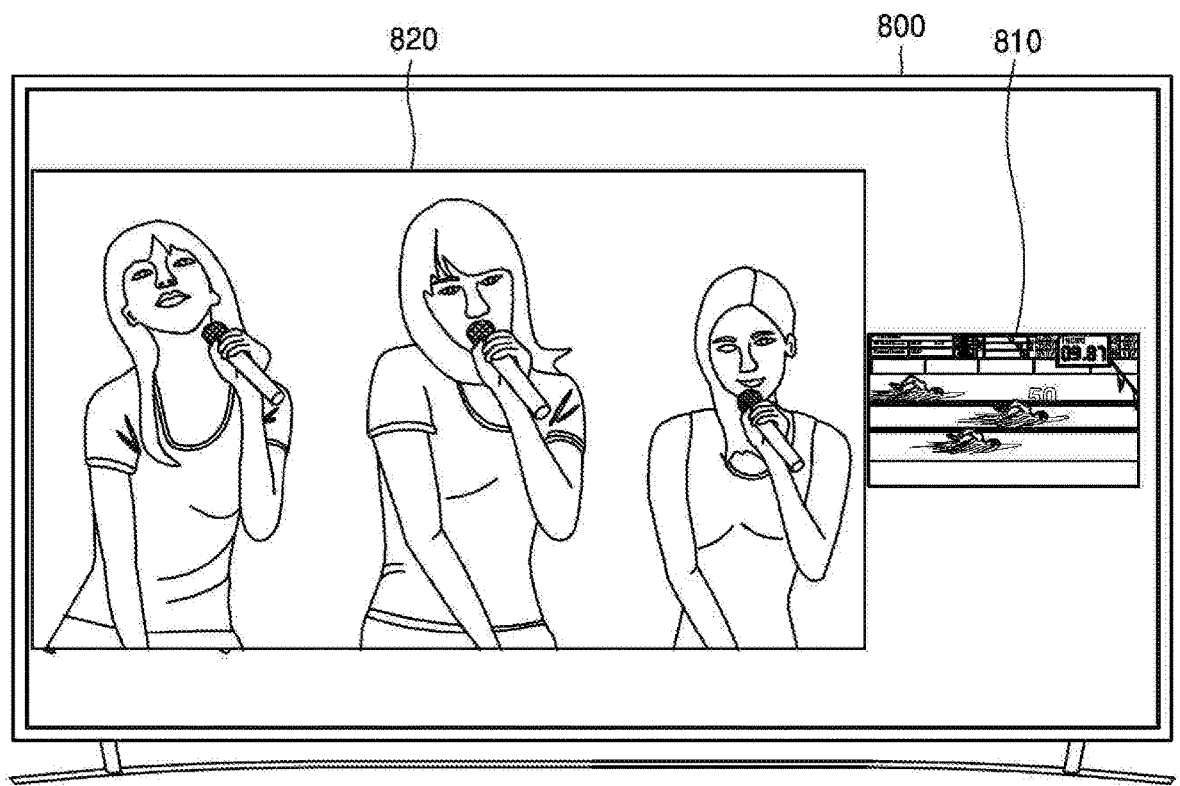

FIG. 11A illustrates another example of changing the area of a window, that is, an example of changing both the size and the location of a window.

For example, when a user views his or her preferred channel program, the user may want to view the preferred channel program as a large screen image by magnifying a window on which the preferred channel program is output, and the user may also want to view the preferred channel program at a desired window location.

Referring to FIG. 11A, when a program of a channel preferred by a user is output, the controller 180 may control the display 115 to locate the window 820, on which the preferred channel program is output, on the left side of the screen and locate the window 810 on the right side thereof, and control the display 115 to magnify the size of the window 820 and reduce the size of the window 810.

Figure 11B:
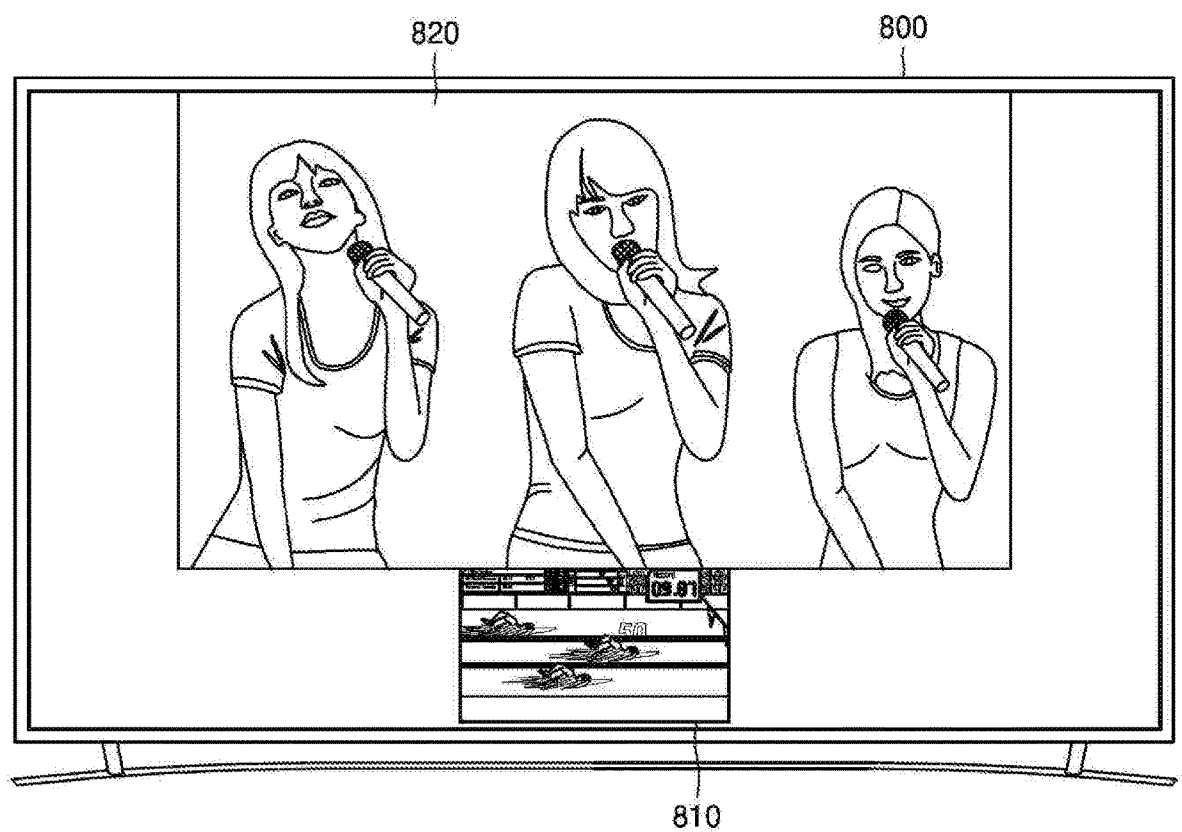

Referring to FIG. 11B, when a program of a channel preferred by a user is output, the controller 180 may control the display 115 to magnify the size of the window 820, on which the preferred channel program is output, and reduce the size of the remaining window 810, as illustrated in FIG. 11A, and may also control the display 115 to locate the window 820 on the central upper side of the screen and locate the window 810 on the central lower side thereof.

Figure 11C:
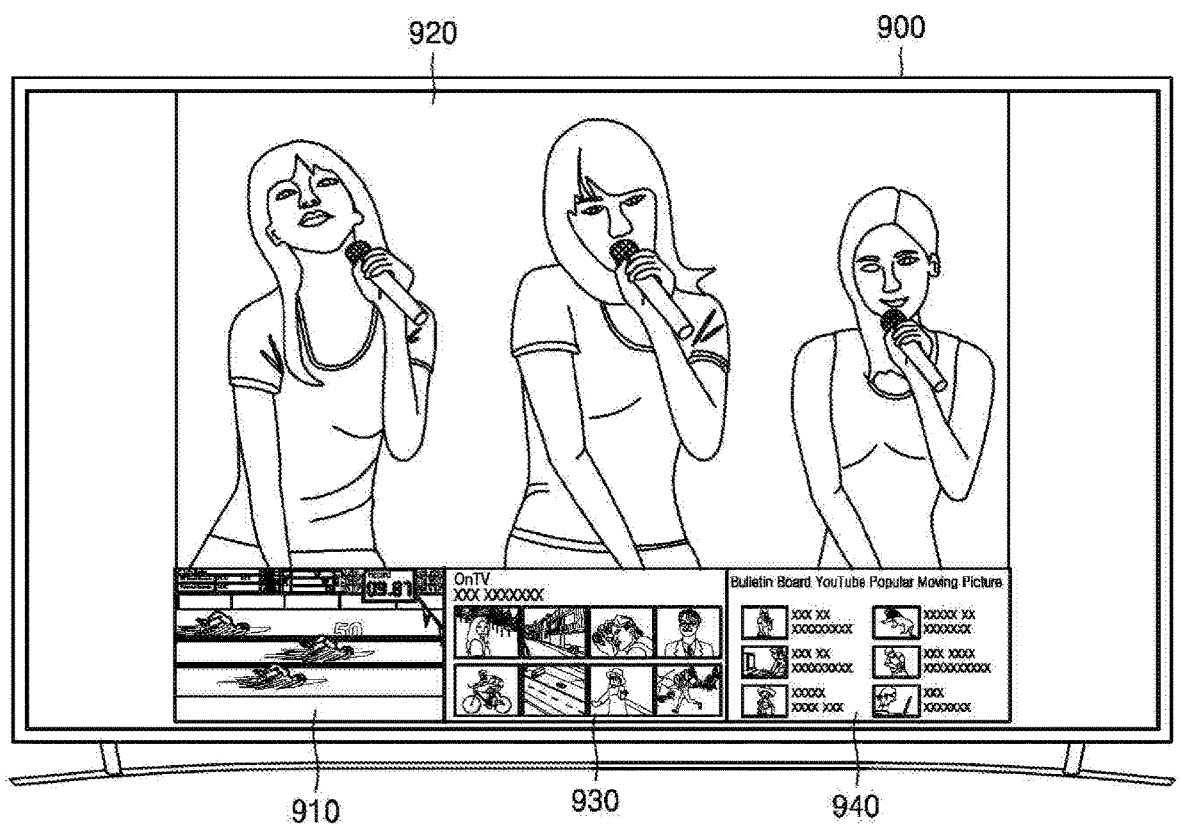

Referring to FIG. 11C, when the multi-window screen image 900 including the four windows 910, 920, 930, and 940 as illustrated in FIG. 9A is provided and a program of a channel preferred by a user is output on the window 920, the controller 180 may control the display 115 to magnify the size of the window 920, on which the preferred channel program is output, and locate the window 920 on the central upper side of the multi-window screen image 900, and to reduce the sizes of the remaining windows 910, 930, and 940 and locate the windows 910, 930, and 940 on the central lower side thereof.

Figure 11D:
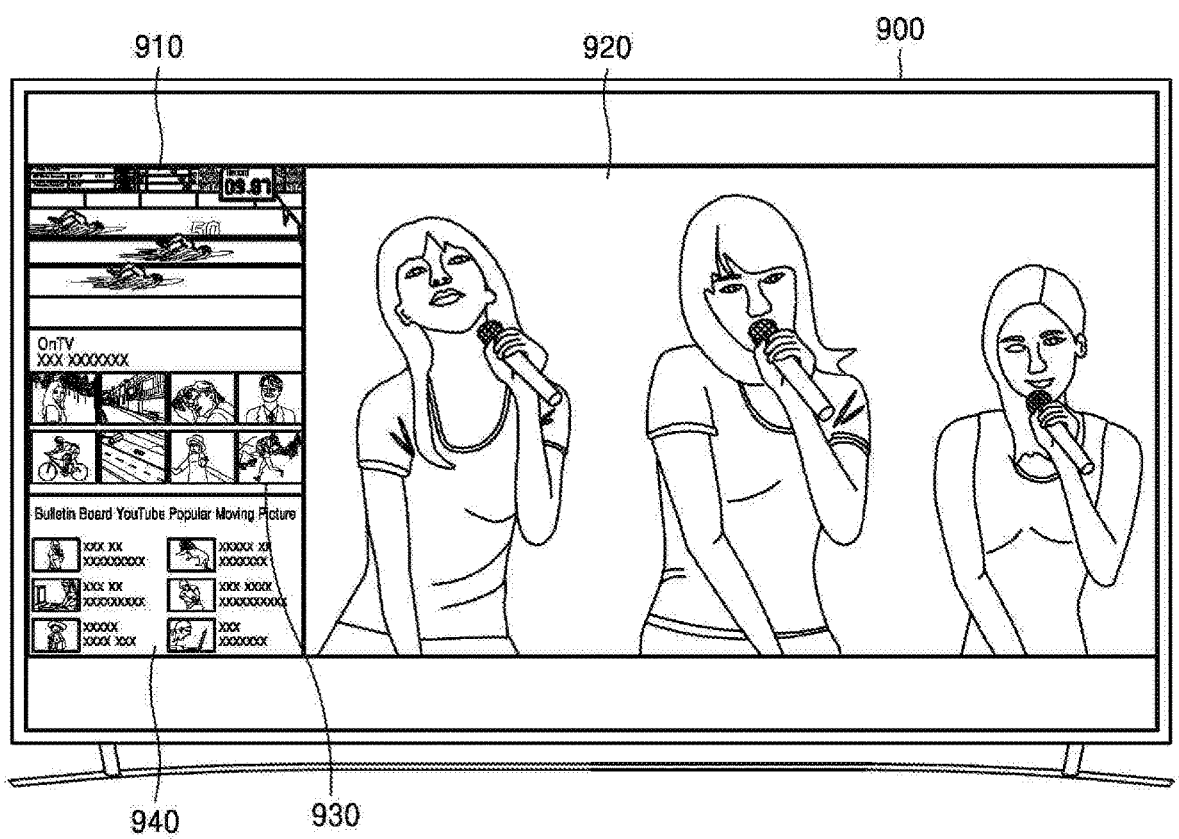

Referring to FIG. 11D, when the multi-window screen image 900 including the four windows 910, 920, 930, and 940 as illustrated in FIG. 9A is provided and a program of a channel preferred by a user is output on the window 920, the controller 180 may control the display 115 to magnify the size of the window 920, on which the preferred channel program is output, and locate the window 920 on the right side of the multi-window screen image 900, and to reduce the sizes of the remaining windows 910, 930, and 940 and locate the windows 910, 930, and 940 on the left side thereof.

Figure 12A:
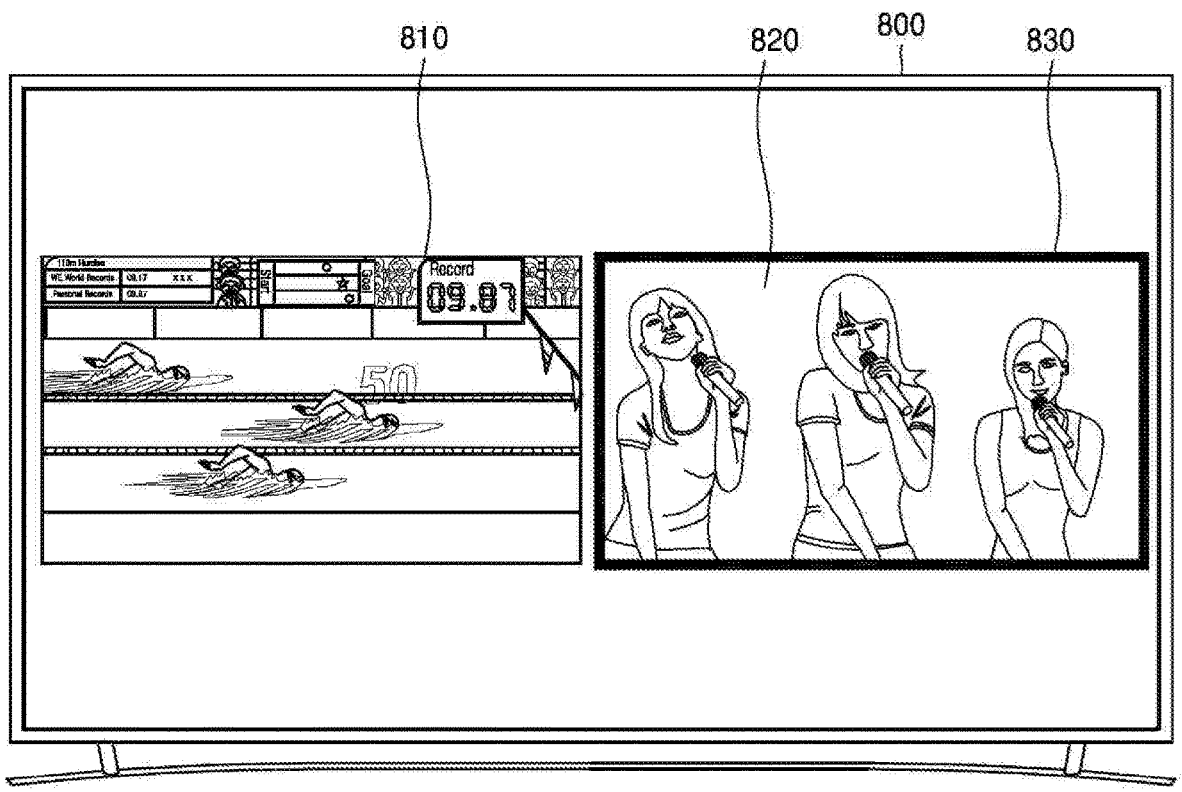
FIGS. 12A and 12B illustrate examples of providing a visual effect to a window according to exemplary embodiments.

FIG. 12A illustrates another example of changing the area of a window, that is, an example of providing a visual effect to a window.

For example, when a user views his or her preferred channel program, the user may want to see the preferred channel program as a large screen image by magnifying a window on which the preferred channel program is output, and may also want to provide a particular visual effect to the window.

Referring to FIG. 12A, the controller 180 may control the display 115 to provide a highlight effect 830 to the edge of the window 820, on which a user preferred channel program is output. The display 115 may provide a visual effect to the window 820 by using graphics received via the graphical processor 184.

Figure 12B:
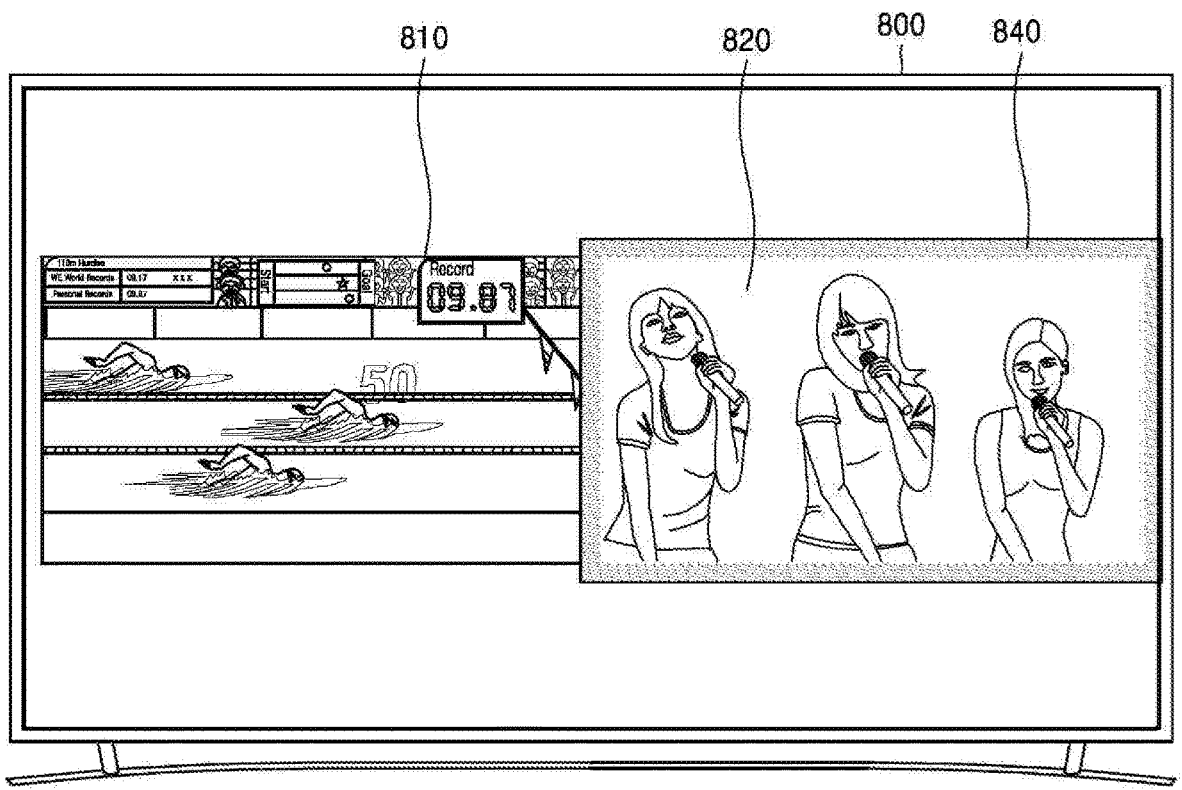

Referring to FIG. 12B, the controller 180 may control the display 115 to provide a neon effect 840 to the edge of the window 820, on which the user preferred channel program is output. The display 115 may provide a visual effect to the window 820 by using graphics received via the graphical processor 184.

Figure 12C:
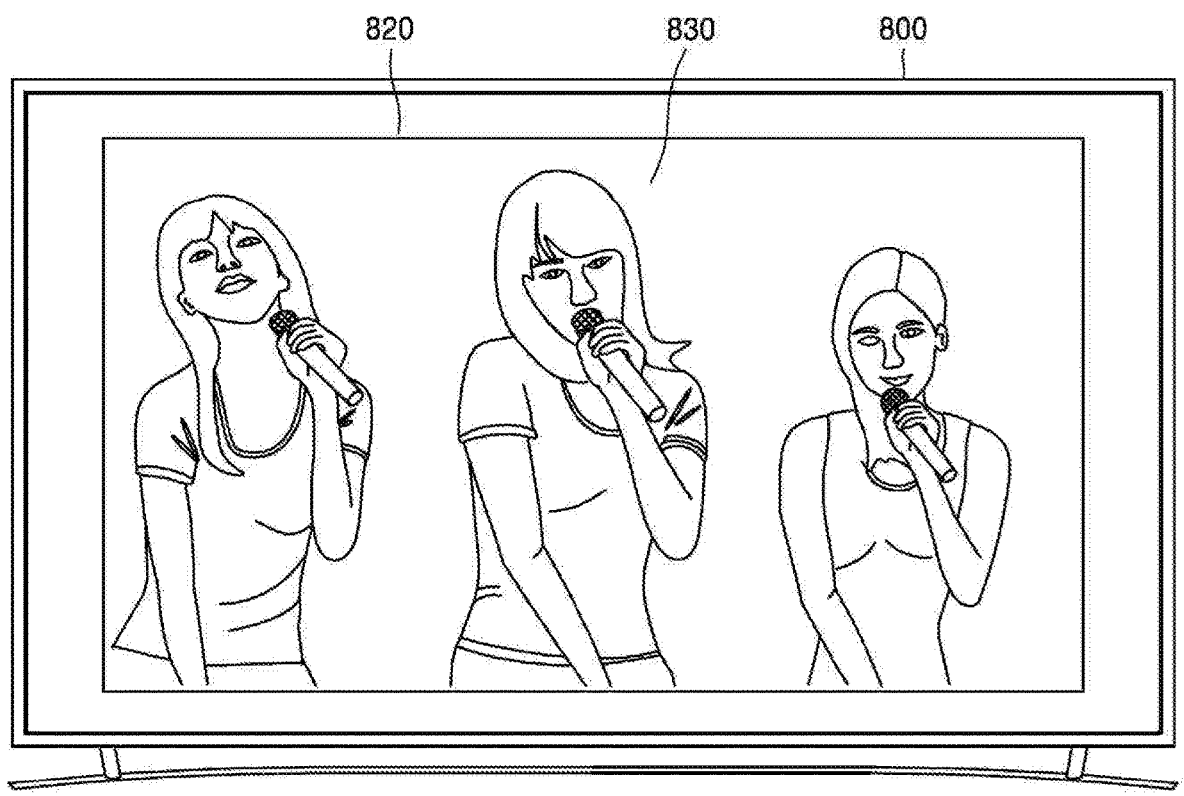
FIG. 12C illustrates an example of outputting a program of a user preferred channel, a view reserved program, or a reproduction-reserved program via a single window according to an exemplary embodiment.

Referring to FIG. 12C, the controller 180 may control the display 115 to display only the window 820, on which the user preferred channel program is output, on the multi-window screen image 800 of the display 115, while providing or not providing a particular visual effect to the window 820. For example, when a user finds a user preference channel via channel zapping while viewing a multi-window screen image, the controller 180 may control the display 115 to display a single-window screen image that outputs a program of the preferred channel of the user. When a user views a multi-window screen image and the time arrives for which viewing reservation is set by the user, the controller 180 may change the multi-window screen image into a single-window screen image when outputting a view reserved program via a window, such that only the window on which the view reserved program is output is provided to the screen of the display 115.

An effect that may be provided to a window is not limited thereto, and it will be understood by one of ordinary skill in the art that various other visual effects may be provided by using graphic processing.

To change the area of a window, at least one selected from a size change of the window, a location change thereof, and provision of a visual effect thereto may be performed.

Examples of a UI for changing a window area will now be described with reference to FIGS. 13-21.

Figure 13:
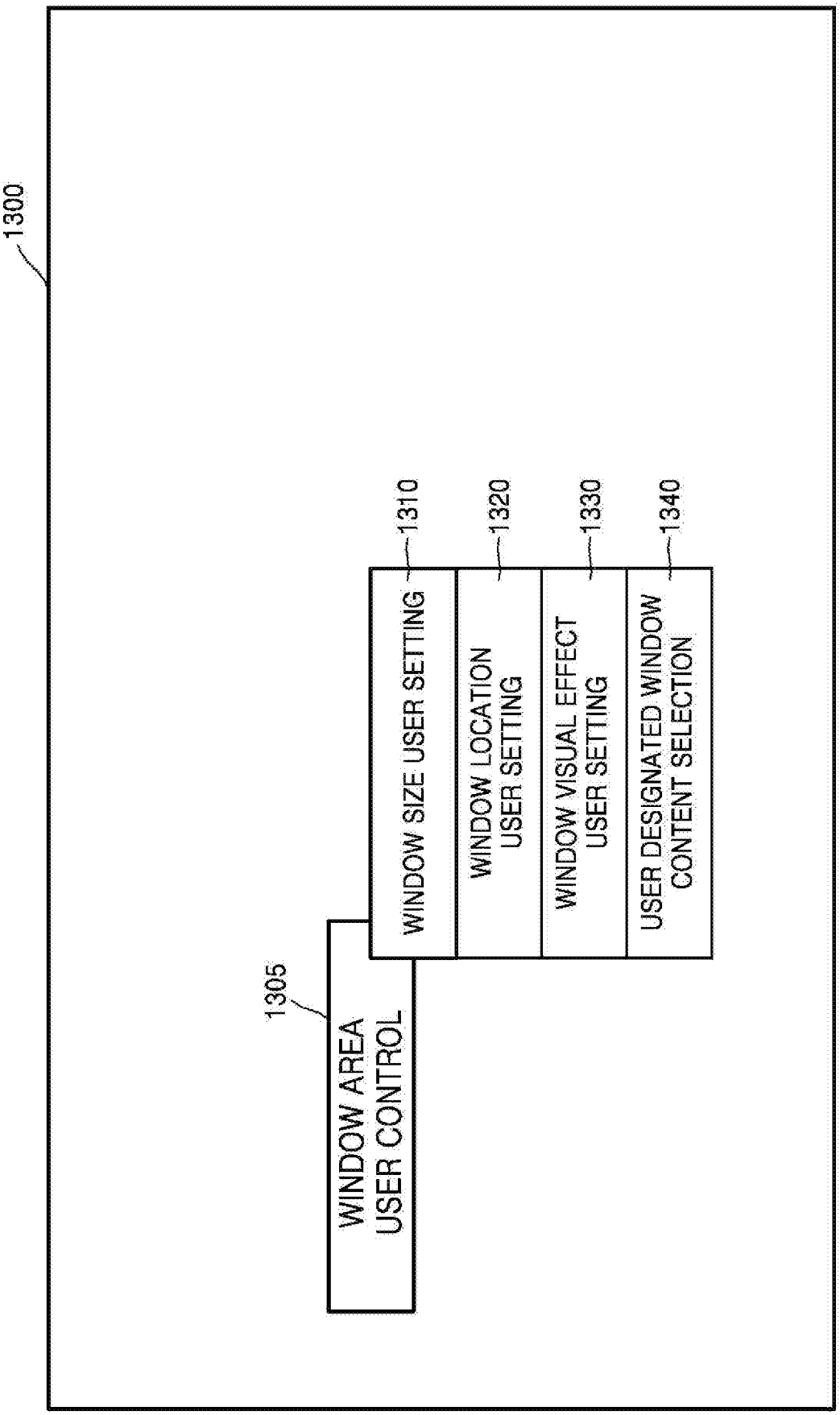
FIG. 13 illustrates a user interface (UI) for changing a window area according to an exemplary embodiment.

FIG. 13 illustrates a UI 1300 for changing a window area.

Referring to FIG. 13, when a user selects a <window area user control> item 1305 on the UI 1300 by using the control device 200, the controller 180 may output a detailed list of items 1310, 1320, 1330, and 1340 for window area user control.

The <window size user setting> item 1310 may be a menu for setting the size of a user designated window that is to output a user preferred channel.

The <window location user setting> item 1320 may be a menu for setting the location of the user designated window that is to output the user preferred channel.

The <window visual effect user setting> item 1330 may be a menu for setting a visual effect that is to be provided to the user designated window that is to output the user preferred channel.

The <user designated window content selection> item 1340 may be a menu for setting the type of content that is output on a window that is to be designated by a user to be used for a specific purpose, such as, for example, output of the user preferred channel.

The UI 1300 of FIG. 13 is only an example, and it may be obvious to one of ordinary skill in the art that various modifications may be made thereto.

FIG. 14A illustrates a UI 1400 that may be provided when the <window size user setting> item 1310 is selected by a user in FIG. 13.

Referring to FIG. 14A, the UI 1400 may display a message 1410 for indicating that the UI 1400 is associated with a <window size user setting> menu, and a manipulation message 1420 for a user's setting, which is <Please move a bar by a desired window size by using a remote controller.>. Reduced display screen graphics 1430 are provided such that a user may intuitively understand a window size setting. For example, the display screen graphics 1430 may represent a multi-window screen image including two windows 1440 and 1450, and a bar 1460 that is movable between the two windows 1440 and 1450 may be arranged on the display screen graphics 1430. The user may set a desired size of a window while moving the bar 1460 by using the control device 200, such as a remote controller. The user may move the bar 1460 by using 2 direction keys or 4 direction keys of the control device 200, by using a touch pad, or by using a pointing device.

Assuming that a window that is to be controlled by a user is the window 1450, when the user moves the bar 1460 to the left by using a remote controller, the size of the window 1450 is magnified as illustrated in FIG. 14B. Accordingly, the size of the window 1440 may be reduced. When the bar 1460 is moved to a desired location and then an <OK> item 1470 is selected, the size of the window 1450 may be set. A horizontal to vertical ratio of the magnified window 1450 may depend on a ratio value pre-stored in the storage 190, or, in some exemplary embodiments, a bar capable of vertically adjusting the size of a window may be further included so that a user may designate both the horizontal and vertical sizes of the window.

Figure 15A:
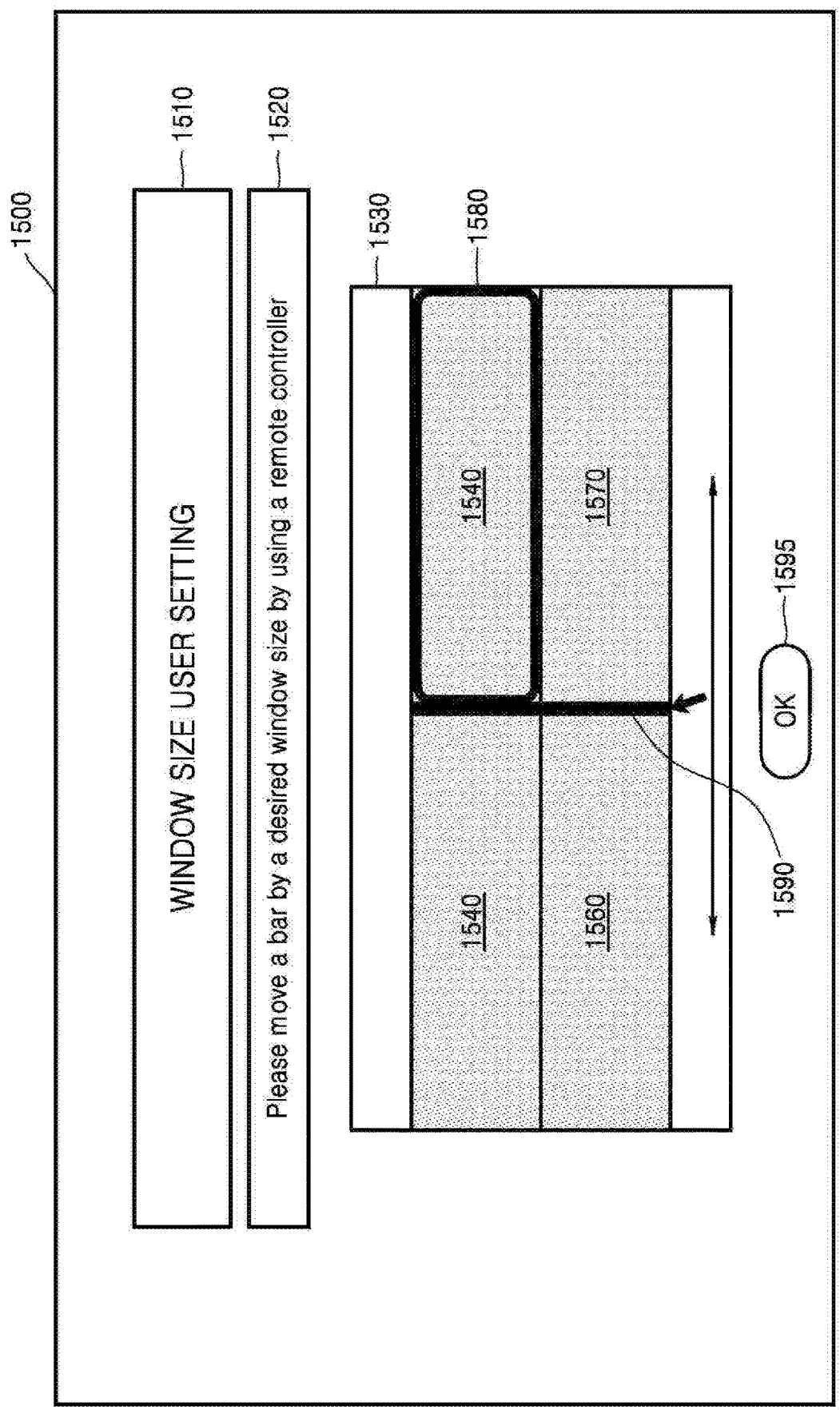
FIGS. 15A and 15B illustrate a UI for setting the size of a window when a multi-window screen image including four windows is provided according to exemplary embodiments.

FIG. 15A illustrates a UI 1500 for setting the size of a window when a multi-window screen image including four windows is provided.

Referring to FIG. 15A, the UI 1500 may display a message 1510 for representing that the UI 1500 is associated with a <window size user setting> menu, and a manipulation message 1520 for a user's setting, which is <Please move a bar by a desired window size by using a remote controller.>. Reduced display screen graphics 1530 are provided such that a user may intuitively understand a window size setting. For example, the display screen graphics 1530 may represent a multi-window screen image including four windows 1540, 1550, 1560, and 1570, and a bar 1590 that is movable may be arranged on the center of the display screen graphics 1530. The user may set a desired size of a window while moving the bar 1590 by using the control device 200, such as a remote controller.

Figure 15B:
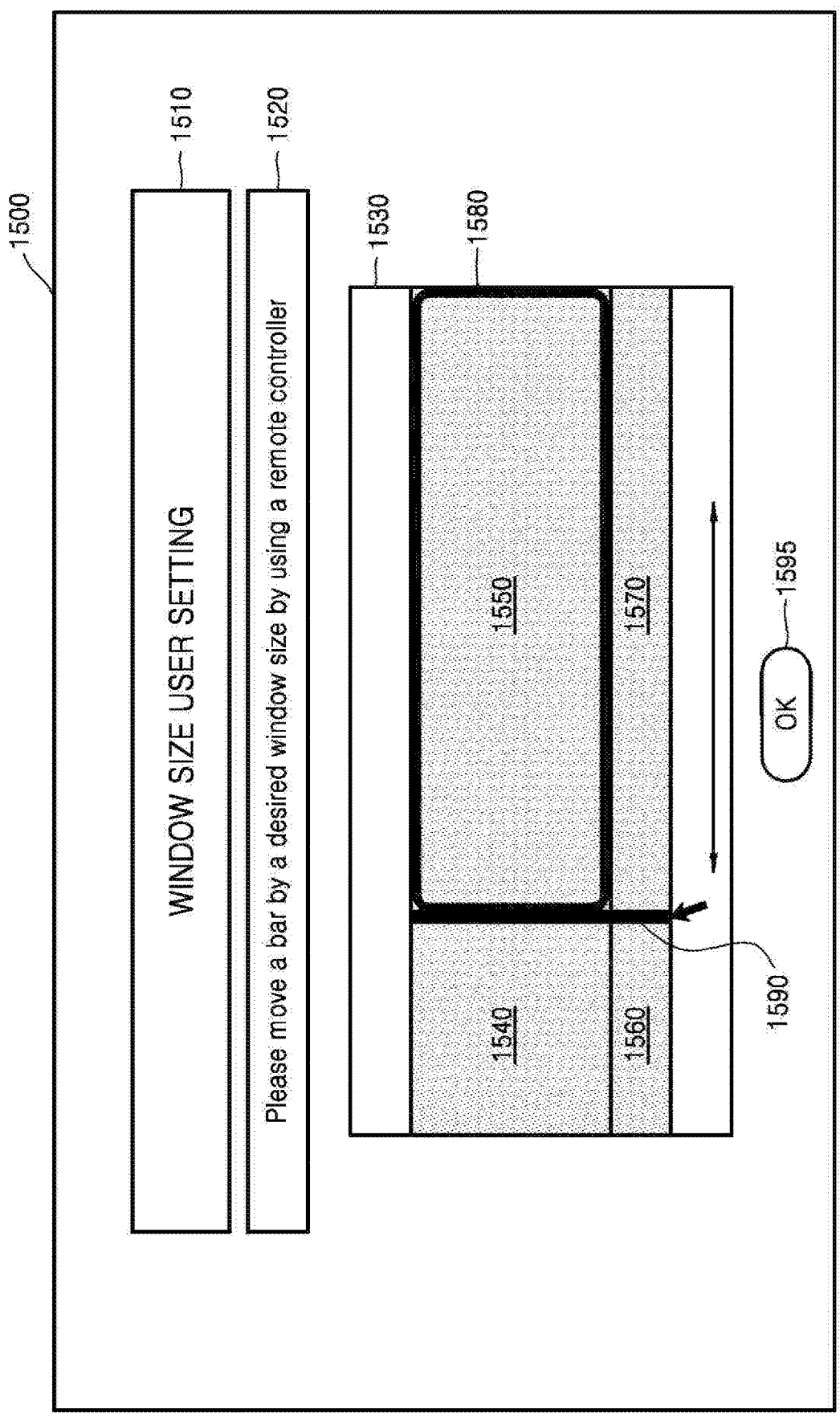

In an example that a window that is to be controlled by a user is the window 1550, when the user moves the bar 1590 to the left by using a remote controller, the size of the window 1550 is magnified as illustrated in FIG. 15B. Accordingly, the sizes of the other windows may be reduced.

When the bar 1590 is moved to a desired location and then an <OK> item 1595 is selected, the size of the window 1550 may be set. A horizontal to vertical ratio of the magnified window 1550 may depend on a ratio value pre-stored in the storage 190, or a bar capable of vertically adjusting the size of a window may be further included so that a user may designate both the horizontal and vertical sizes of the window.

Figure 16A:
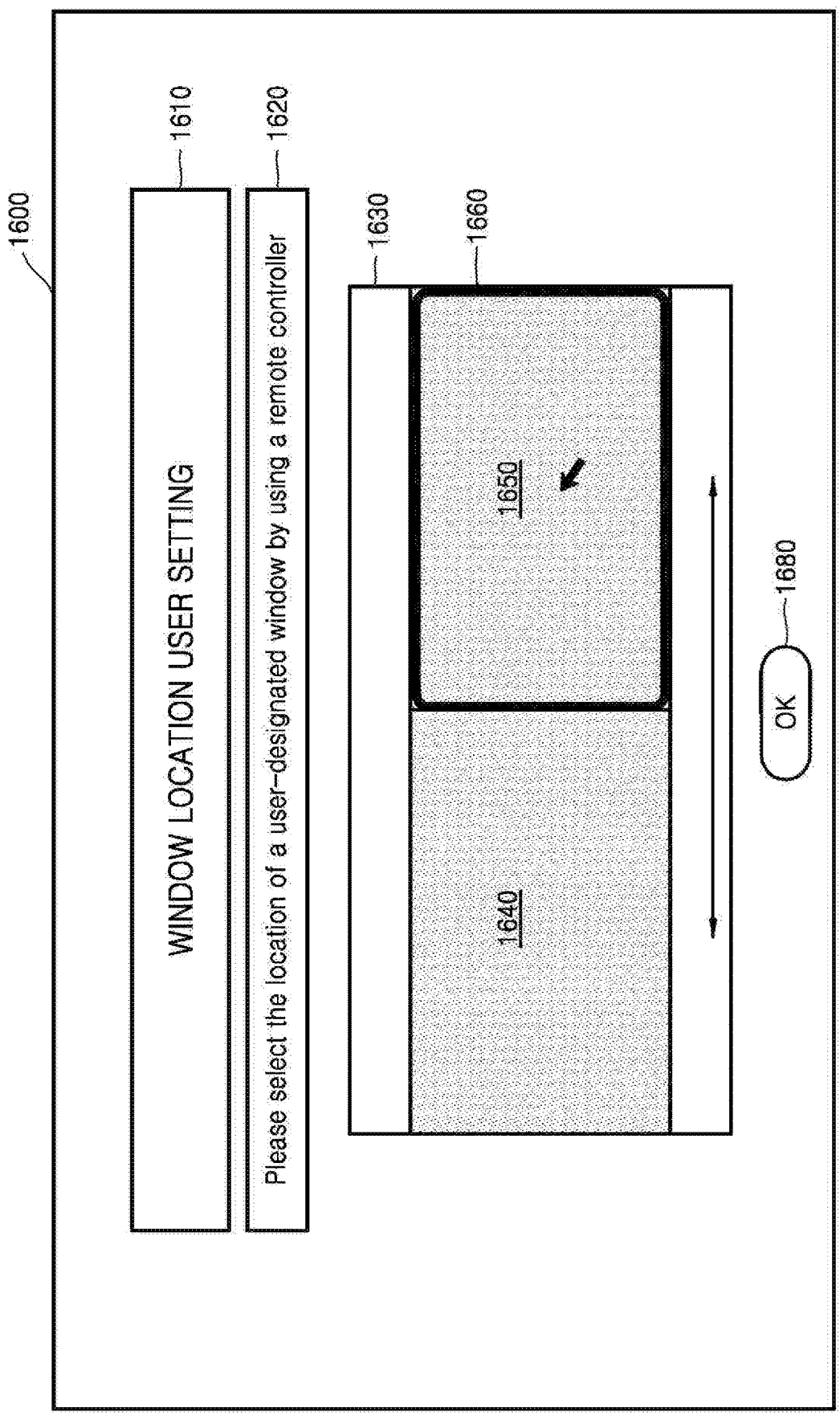
FIGS. 16A and 16B illustrate a UI that may be provided when a <window location user setting> item is selected by a user in FIG. 13 according to exemplary embodiments.

FIG. 16A illustrates a UI 1600 that may be provided when the <window location user setting> item 1320 is selected by a user in FIG. 13.

Referring to FIG. 16A, the UI 1600 may display a message 1610 for indicating that the UI 6100 is associated with a <window location user setting> menu, and a manipulation message 1620 for a user's setting, which is <Please select the location of a user-designated window by using a remote controller.>. Reduced display screen graphics 1630 are also displayed such that a user may intuitively understand window location setting. For example, the display screen graphics 1630 may represent a multi-window screen image including two windows 1640 and 1650, and a user may set the location of a user-designated window by selecting one window from the two windows 1640 and 1650 and selecting an <OK> item 1680 by using the control device 200, such as a remote controller. To display the location of the window selected by the user, the selected window may be provided with an effect 1660 representing that the location of the selected window has been selected.

Figure 16B:
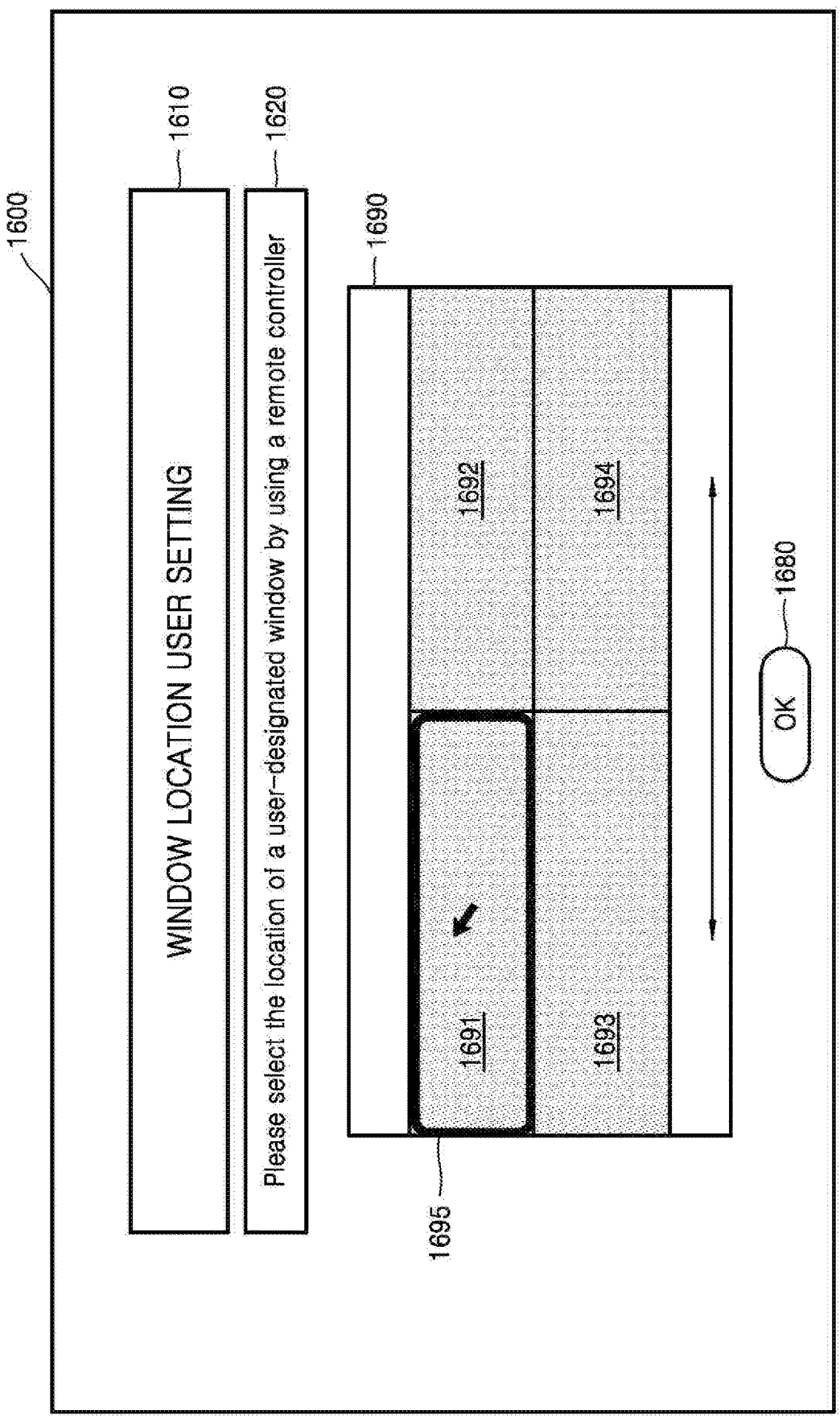

In FIG. 16B graphics 1690 representing a multi-window screen image including four windows are displayed in FIG. 16B. Similarly to FIG. 16A, a user may select the location of a user-designated window by selecting one from four windows 1691, 1692, 1693, and 1694 and selecting an <OK> item 1680, by using the control device 200, such as a remote controller. To display the location of the window selected by the user, the selected window may be provided with an effect 1695 representing that the location of the selected window has been selected.

Figure 17:
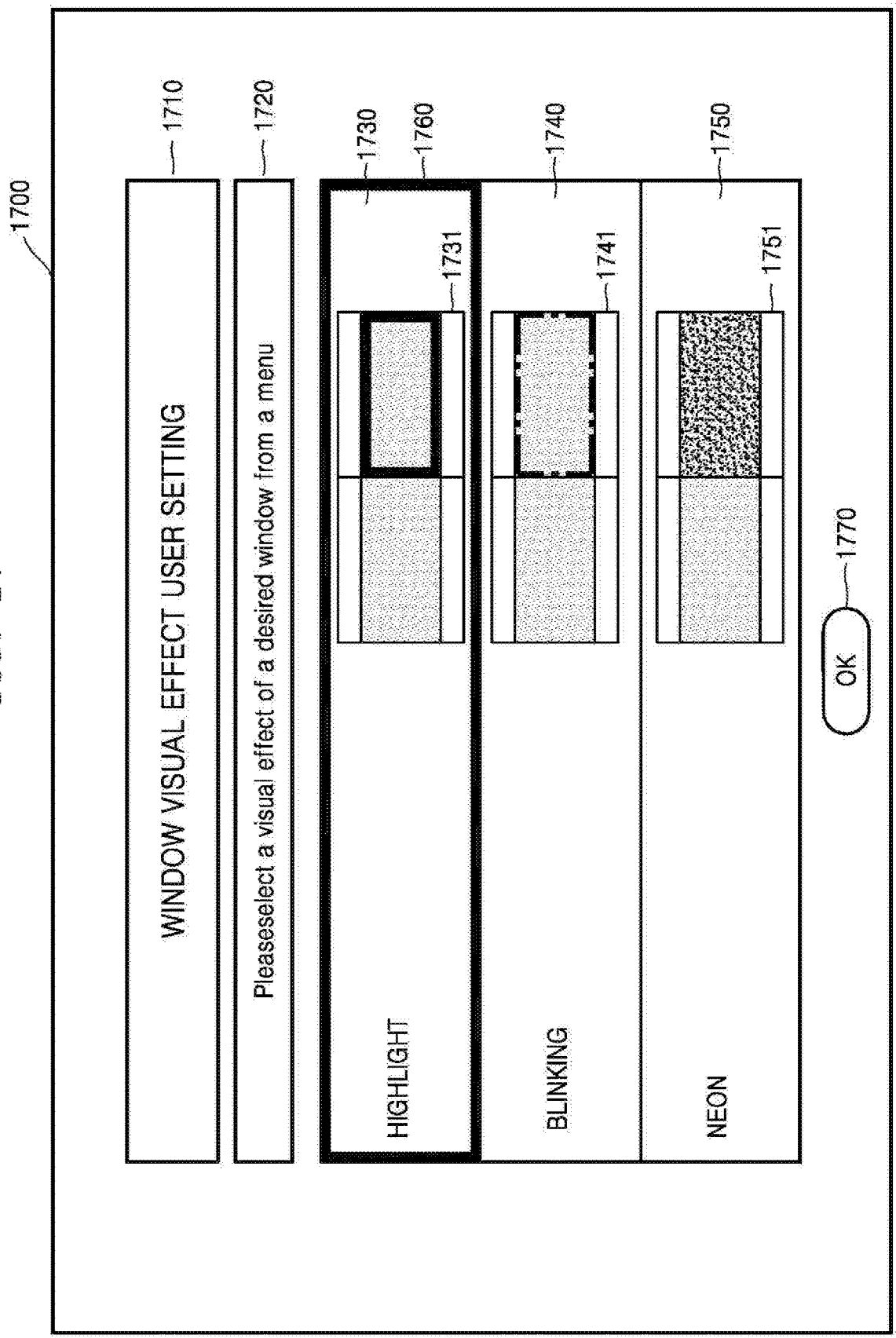
FIG. 17 illustrates a UI that may be provided when a <window visual effect user setting> item is selected by a user in FIG. 13, according to an exemplary embodiment.

FIG. 17 illustrates a UI 1700 that may be provided when the <window visual effect user setting> item 1330 is selected by a user in FIG. 13.

Referring to FIG. 17, the UI 1700 may display a message 1710 for showing that the UI 1700 is associated with a <window visual effect user setting> menu, and a manipulation message 1720 for a user's setting, which is <Please select a visual effect of a desired window from a menu.>. A list of visual effects that are applicable to a window may also be displayed on the UI 1700. A highlight visual effect item 1730 displays an output status 1731 of a screen image to which a highlight visual effect has been applied, a blinking visual effect item 1740 displays an output status 1741 of a screen image to which a blinking visual effect has been applied, and a neon visual effect item 1750 displays an output status 1751 of a screen image to which a neon effect has been applied. When the user selects a desired visual effect item and selects a confirmation item 1770 by using the control device 200, the selected visual effect item may be set. To represent that one item has been selected, the controller 200 may use an edge color 1760 or the like on the selected item.

FIG. 18 illustrates a UI 1800 that may be provided when the <user-designated window content selection> item 1340 is selected by a user in FIG. 13.

Referring to FIG. 18, the UI 1800 may display a message 1810 for representing that the UI 1800 is associated with a <user-designated window content selection> menu. A list of pieces of content that are to be output on a user-designated window may also be displayed on the UI 1800.

According to an exemplary embodiment, the list may include a <preferred channel program> item 1820, a <view reserved content> item 1830, and a <reproduction-reserved content> item 1840. A user may select at least one from the items 1820, 1830, and 1840 included in the list according to content that is desired to be output on a user-designated window, and selects an <OK> item 1850, by using the control device 200. For example, when the <preferred channel program> item 1820 and the <view reserved content> item 1830 are selected as illustrated in FIG. 18, the controller 180 may change the area of a window on which a preferred channel program or view reserved content is output, from among the windows of a multi-window screen image.

A method in which a user sets a preferred channel in the display apparatus 200 will now be described with reference to FIGS. 19A and 19B.

Figure 19A:
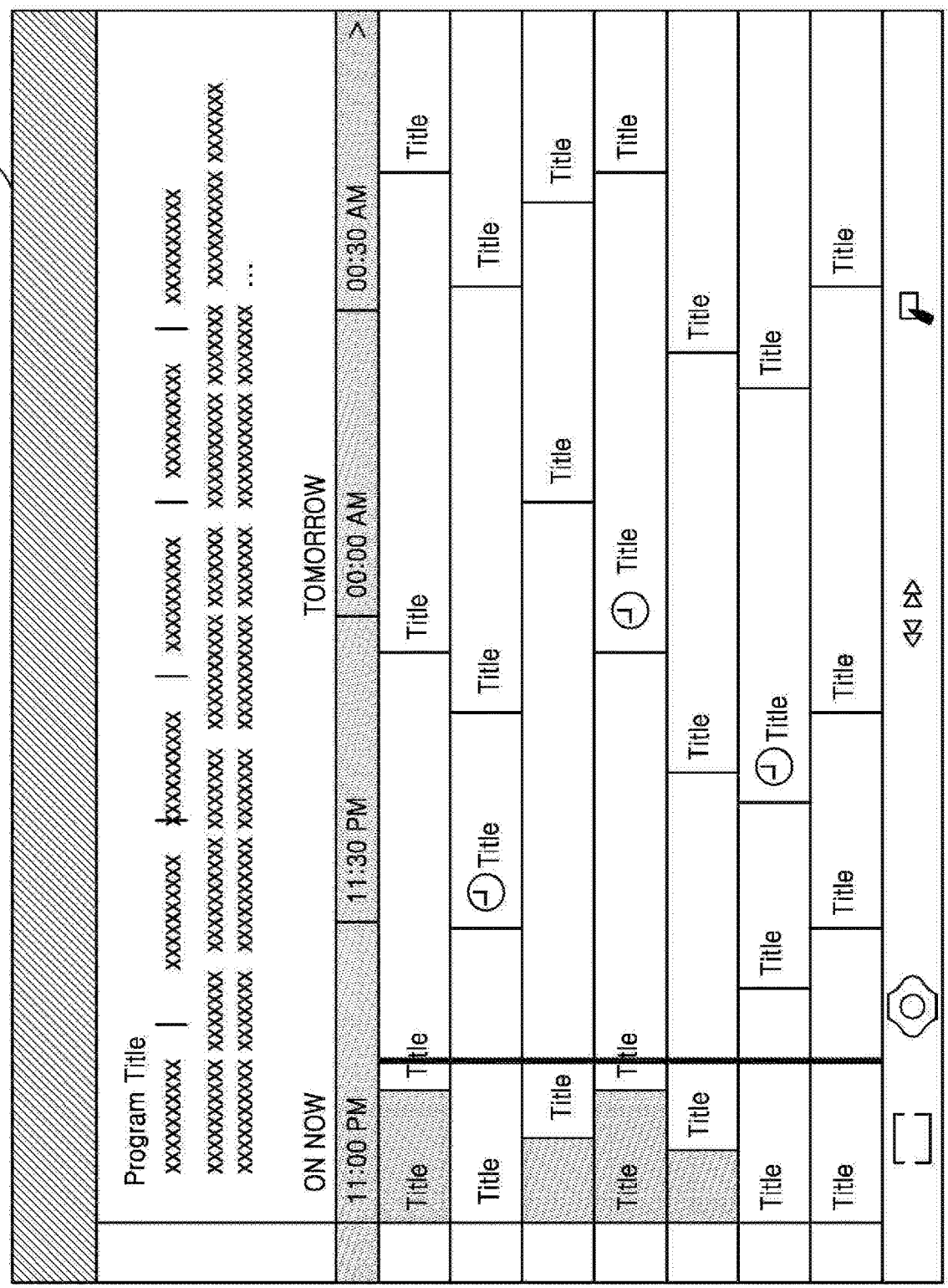
FIGS. 19A and 19B illustrate a method in which a user sets a preferred channel in the display apparatus, according to exemplary embodiments.

FIG. 19A illustrates an EPG 1900, which is an example of TV broadcasting guide information that may be provided to the display 115 of the display apparatus 200. Information about programs of each channel that are broadcasted at different times may be displayed on the EPG 1900.

Figure 19B:
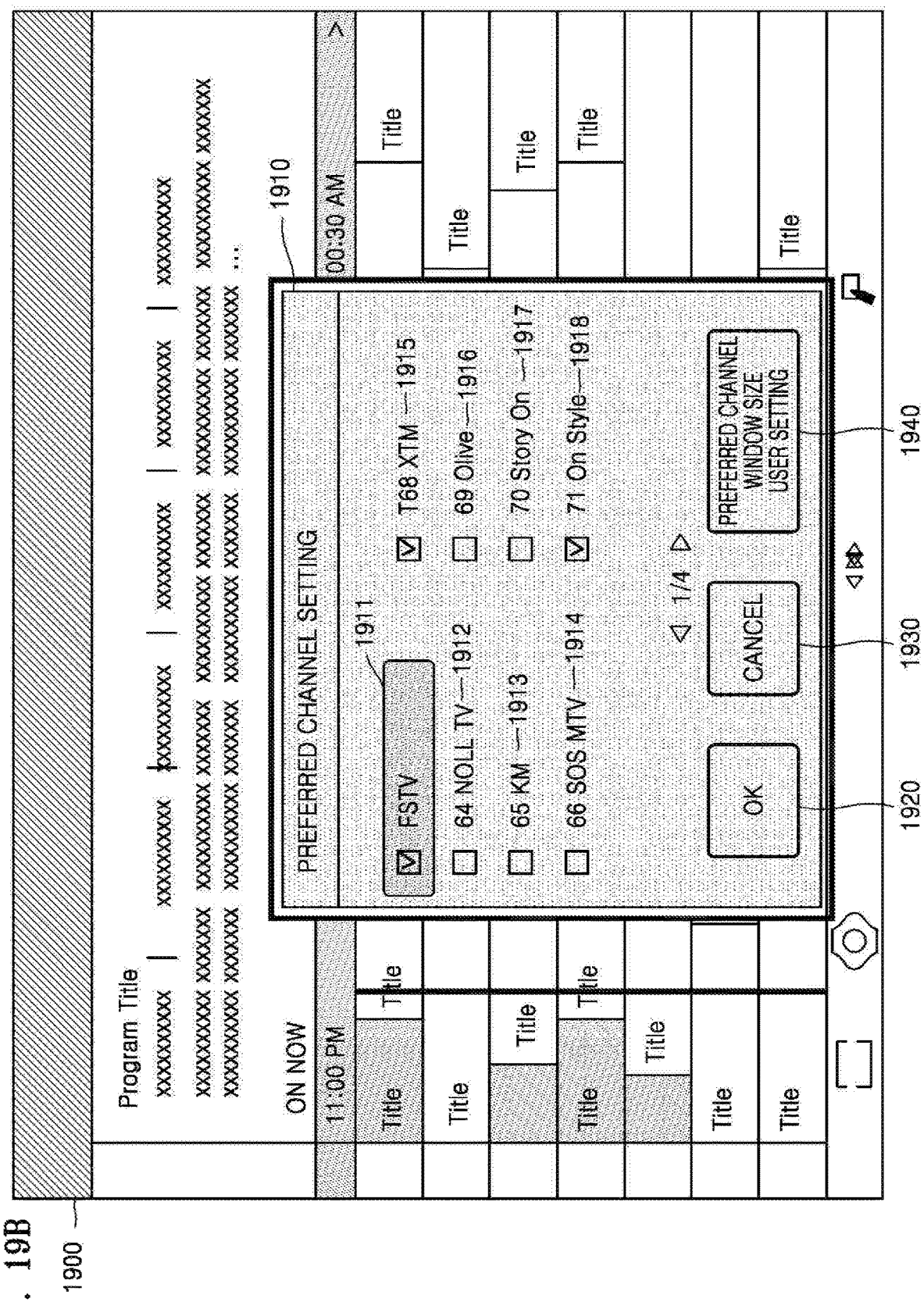

FIG. 19B illustrates a UI for setting a preferred channel.

Referring to FIG. 19B, when a user selects a menu for a preferred channel setting, a preferred channel setting menu 1910 may be output. The preferred channel setting menu 1910 may display channel numbers 1911-1918 that may be selected as preferred channels, an <OK> item 1920, and a <cancel> item 1930. The user may set a preferred channel by selecting one from the displayed channel numbers 1911-1918 and selecting the <confirmation> item 1920 by using the control device 200.

According to an exemplary embodiment, a <preferred channel window size user setting> item 1940 may be displayed. The user may set a preferred channel and simultaneously set the size of a window that is to be used when viewing a program of the preferred channel, by using the <preferred channel window size user setting> item 1940. According to an exemplary embodiment, when the <preferred channel window size user setting> item 1940 is selected, UIs as illustrated in FIGS. 14A-15B may be output. The UIs as illustrated in FIGS. 14A-15B are only an example, and the controller 180 may further provide a UI for setting the location of a window or setting a visual effect that is provided to the window.

FIG. 20 illustrates a UI 2000 for setting a viewing reservation.

In response to a signal of selecting a program that the user desires to reserve viewing from among the programs displayed on the EPG 1900 of FIG. 19A, the controller 180 may control the display 115 to output a viewing reservation setting menu 2010 of FIG. 20A. The viewing reservation setting menu 2010 may display a channel number 2011 of the viewing reservation desired program, broadcasting time information 2012 of the viewing reservation desired program, and summary information 2013 of the viewing reservation desired program. The user may set viewing reservation of the viewing reservation desired program by checking the channel number 2011, the broadcasting time information 2012, and the summary information 2013 of the reservation viewing desired program and then selecting a <viewing reservation> item 2020. A <close> item 2030 is used to conclude outputting of the reservation viewing setting menu 2010.

According to an exemplary embodiment, a <viewing reservation window size user setting> item 2040 may be displayed. The user may set reserved viewing and simultaneously set the size of a window that is to be used when viewing a view reserved program, by using the <viewing reservation window size user setting> item 2040. According to an exemplary embodiment, when the <viewing reservation window size user setting> item 2040 is selected, UIs as illustrated in FIGS. 14A-15B may be output. UIs as illustrated in FIGS. 14A-15B are only an example, and the controller 180 may further provide a UI for setting the location of a window or setting a visual effect that is provided to the window.

Figure 21:
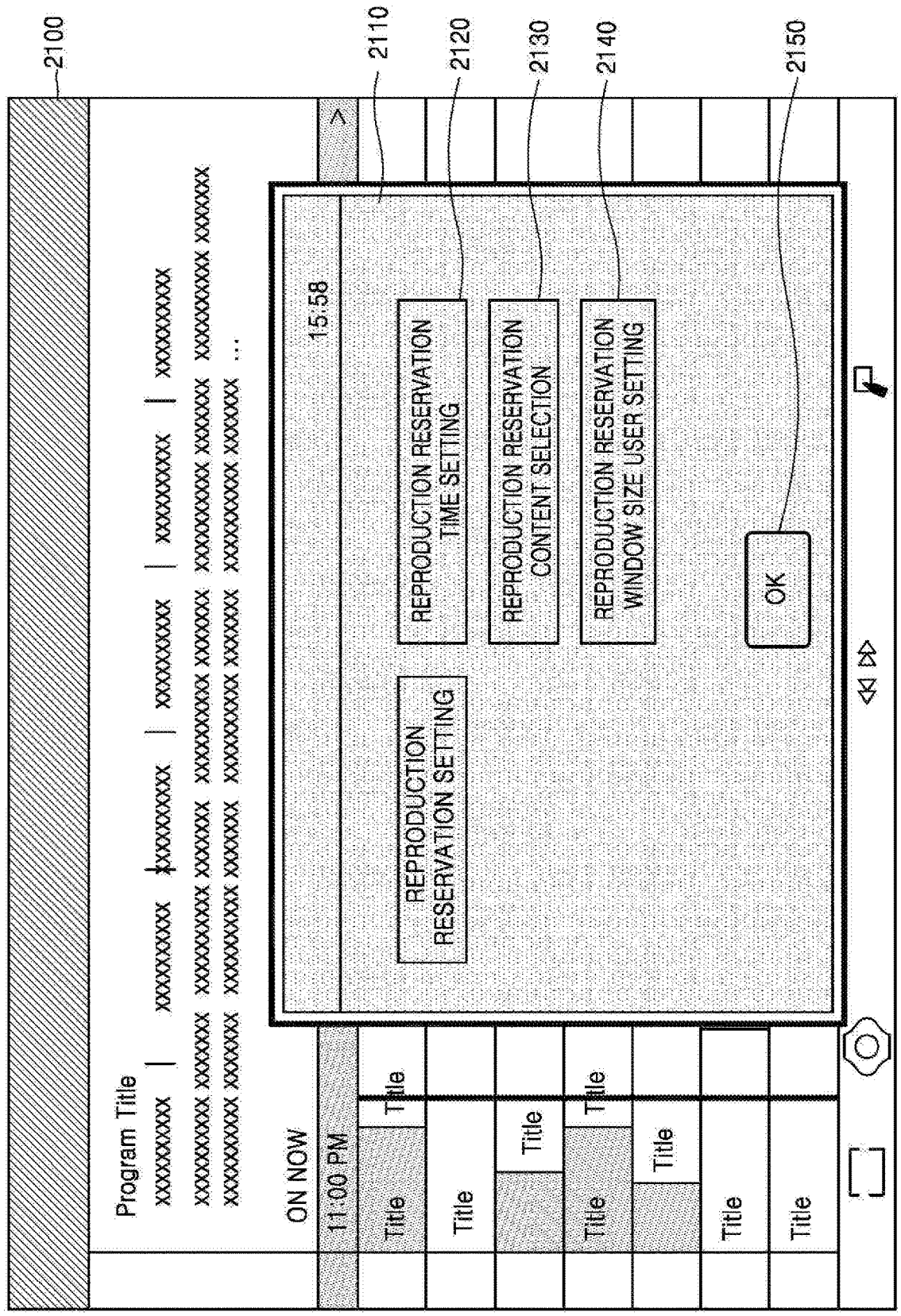
FIG. 21 illustrates a UI for setting reproduction reservation, according to an exemplary embodiment.

FIG. 21 illustrates a UI 2100 for setting reproduction reservation.

In response to a user's selection of a menu for reproduction reservation setting, the controller 180 may control the display 115 to output a reproduction reservation setting menu 2110 of FIG. 21. The reproduction reservation setting menu 2110 may display a <reproduction reservation time setting> item 2120, a <reproduction reservation content selection> item 2130, a <reproduction reservation window size user setting> item 2140, and an <OK> item 2150. The user may set a reserved reproduction time by using the <reproduction reservation time setting> item 2120, and may set reproduction reservation of content by selecting the content by using the <reproduction reservation content selection> item 2130 and then selecting the <confirmation> item 2150. The content of which reproduction is reserved may be received via the input/output interface 170 or may be stored in the storage 190.

According to an exemplary embodiment, a <reproduction reservation window size user setting> item 2140 may be displayed. The user may set reproduction reservation and simultaneously set the size of a window that is to be used when viewing reproduction-reserved content, by using the <reproduction reservation window size user setting> item 2140. According to an exemplary embodiment, when the <reproduction reservation window size user setting> item 2140 is selected, UIs as illustrated in FIGS. 14A-15B may be output. UIs as illustrated in FIGS. 14A-15B are only an example, and the controller 180 may further provide a UI for setting the location of a window or setting a visual effect that is provided to the window.

According to an exemplary embodiment, the controller 180 may check, confirm, or verify the identity of a user and change the area of at least one of the plurality of windows based on a user's setting corresponding to the checked identity of the user.

For example, the storage 190 may store identification information of the user. A variety of information, such as the face, voice, fingerprint, and iris of the user, may be used as the identification information of the user.

The storage 190 may map each user using the display apparatus 100 with the size of a desired window or content information desired to be viewed via a magnified window and store a result of the mapping.

The microphone 161, the camera 162, and the light receiver 163 of the sensor 160 of the display apparatus 100 may sense the face, voice, fingerprint, or iris of the user, and the controller 180 may analyze a result of the sensing and the user identification information stored in the storage 190, thereby checking the identity of the user. The controller 180 may first analyze a user trying to watch the display apparatus 100 as described above, and set a window size by using information set for the user and provide the user with content that is desired to be viewed via a magnified window, according to a result of the analysis.

Figure 22:
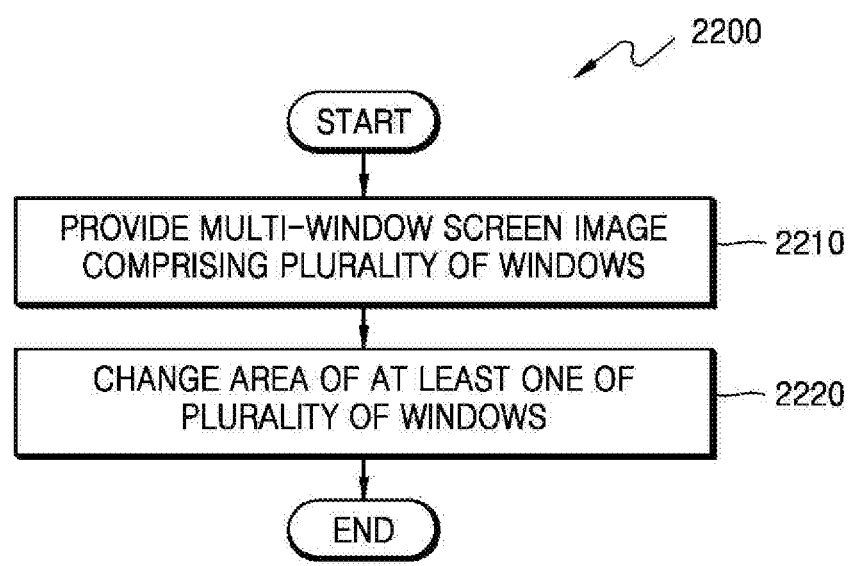
FIG. 22 is a flowchart of a method of operating the display apparatus, according to an exemplary embodiment.

FIG. 22 is a flowchart of a method 2200 of operating the display apparatus 100, according to an exemplary embodiment.

Referring to FIG. 22, in operation 2210, the display apparatus 100 provides a multi-window screen image including a plurality of windows.

Provision of the multi-window screen image including the plurality of windows by the display apparatus 100 has already been described above with reference to FIG. 7.

In operation 2220, the display apparatus 100 changes the area of at least one of the plurality of windows based on content that is reproduced on the at least one window, and provides the at least one window of which the area is changed.

The changing of the area of the at least one window may be as described above with reference to FIG. 7.

According to an exemplary embodiment, the controller 180 may perform at least from among a size change of the at least one window, a location change thereof, and provision of a visual effect thereto, in order to change the area of the at least one window.

According to an exemplary embodiment, instead of changing the size or location of the at least one window, the controller 180 may change the size or location of a window other than the at least one window.

According to an exemplary embodiment, the controller 180 may change the size of the at least one window based on attributes of content that is reproduced on the at least one window.

According to an exemplary embodiment, the controller 180 may change the size of the at least one window from a first size to a second size based on a signal indicating that the attribute of content that is reproduced on the at least one window having the first size has a specific value, and restore the size of the at least one window to the first size based on a signal indicating that the attribute of the content does not have the specific value.

According to an exemplary embodiment, the controller 180 may reduce the size of the at least one window, based on a signal indicating that the attribute of content that is reproduced on the at least one window is an advertisement.

According to an exemplary embodiment, the controller 180 may magnify the sizes of the windows other than the at least one window of which size is reduced.

An example of reducing the size of the at least one window based on a signal indicating that the attribute of content that is reproduced on the at least one window is an advertisement will now be described with reference to FIGS. 23A-23C.

Figure 23A:
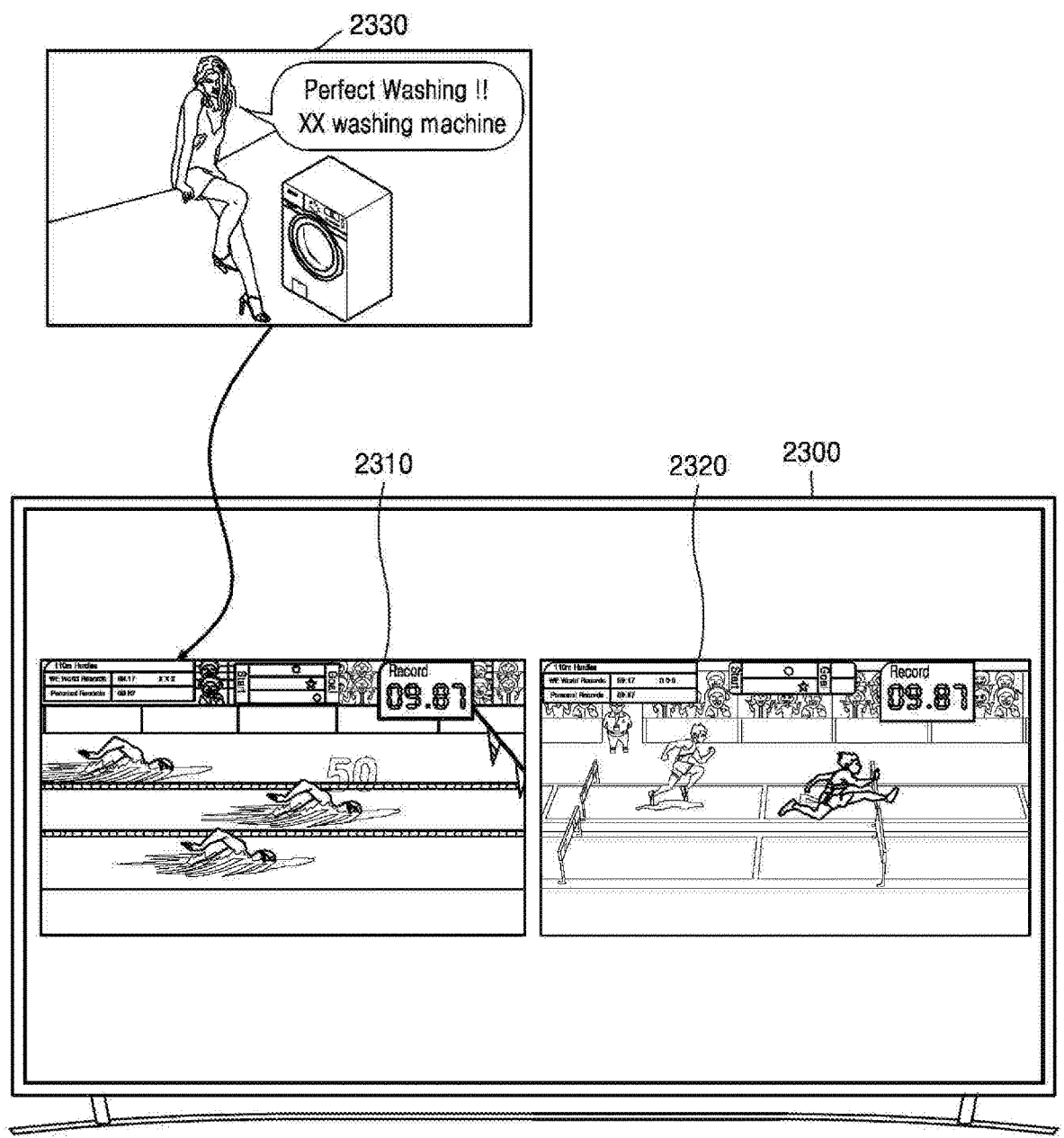
FIGS. 23A-23C illustrate an example of reducing the size of the at least one window based on a signal representing that the attribute of content that is reproduced on the at least one window is an advertisement, according to exemplary embodiments.
Figure 23B:
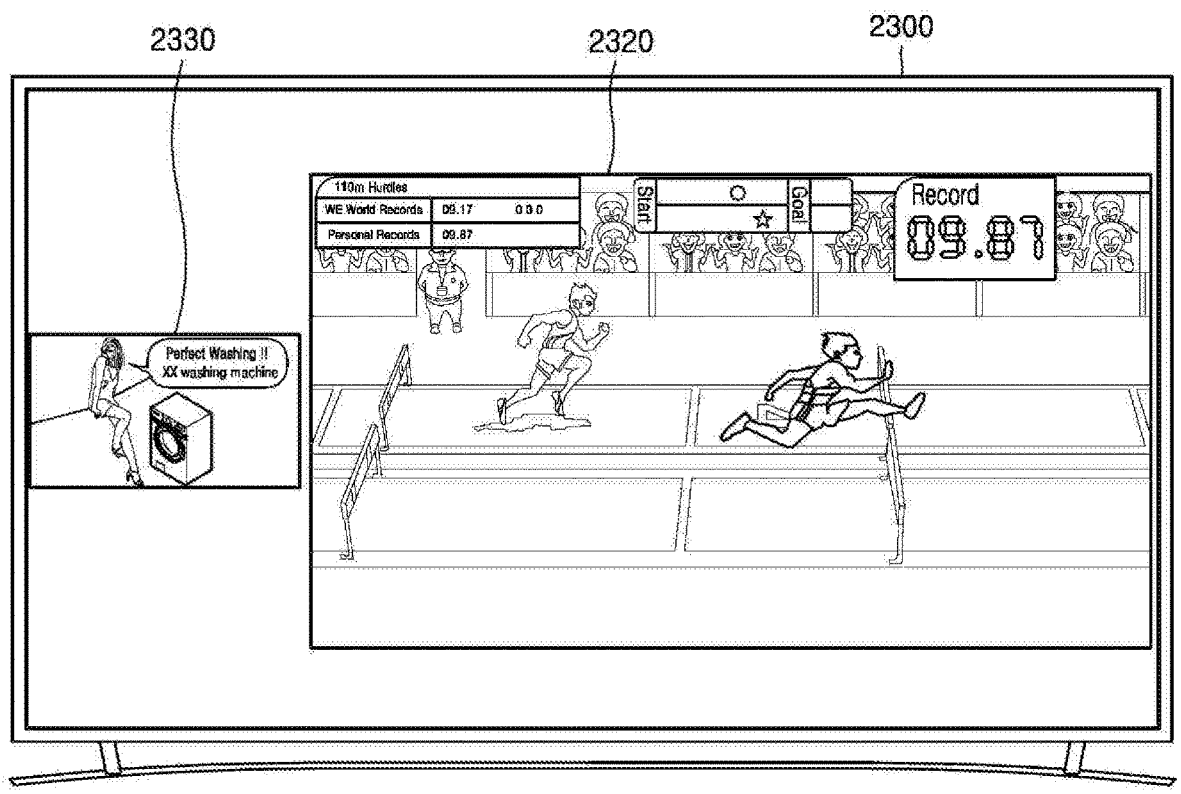

FIG. 23A illustrates a multi-window screen image 2300 including two windows 2310 and 2320. A TV broadcasting program may be output on the window 2310, and content received via the Internet may be output on the window 2320. When the TV broadcasting program is output on the window 2310 and then advertisement content 2330 is output, the controller 180 may reduce the size of the window 2310 while outputting the advertisement content 2330, because a typical viewer is not interested in advertisement content. While the advertisement content in which the viewer is not interested is being output, the size of a window by which the advertisement content is output may be reduced, and the size of the other window may be magnified. In this way, the display space may be efficiently utilized.

The controller 180 may identify a signal indicating that the attribute of content that is reproduced on at least one window is an advertisement, by referring to a program map table (PMT) included in a broadcasting stream.

Figure 23C:
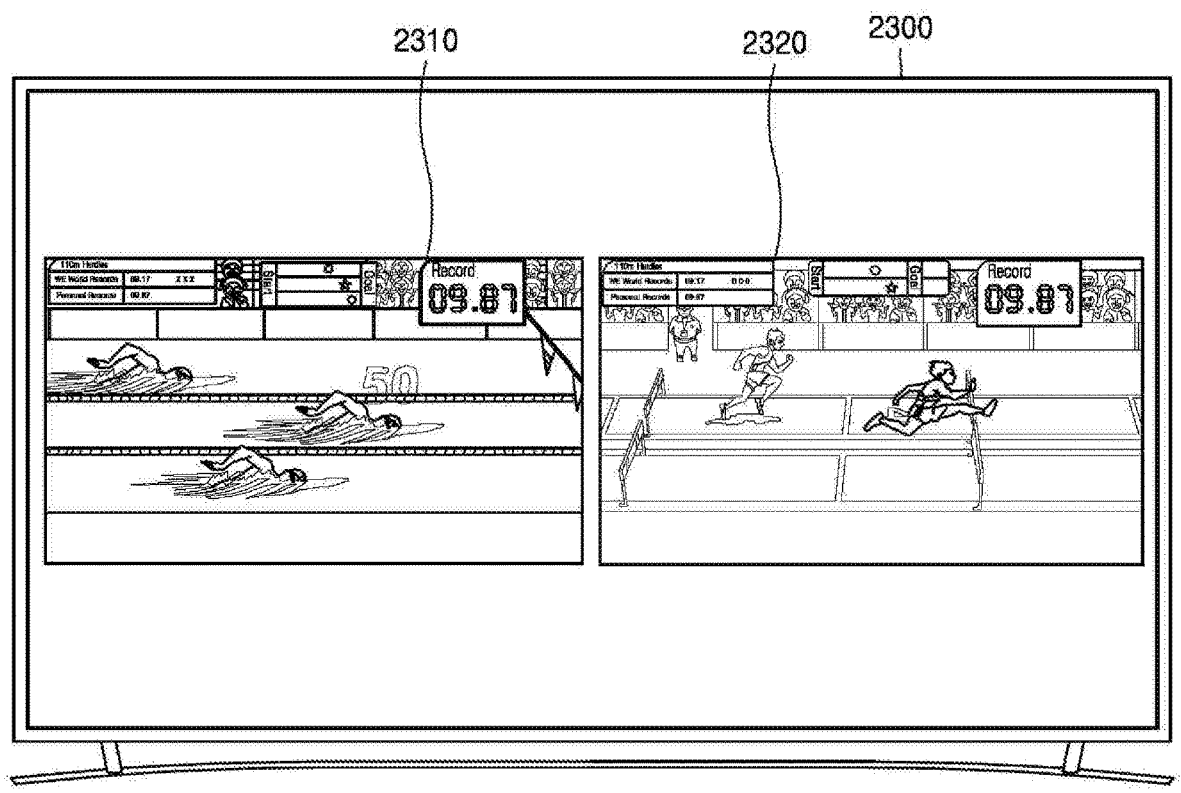

According to an exemplary embodiment, when the output of the advertisement content on the window 2310 is concluded and the TV broadcasting program is output again, the controller 180 may restore the size of the window 2310 to the original size, as illustrated in FIG. 23C.

Although an advertisement is illustrated as the attribute of content in the present exemplary embodiment, other exemplary embodiments are not limited thereto. For example, when content corresponding to a preset grade or rating is output based on grade or rating information representing the violence or sexuality of content, the controller 180 may control the size of a window via which the content is output to be reduced.

According to an exemplary embodiment, the controller 180 may change the area of the at least one window based on a signal indicating that content that is reproduced on the at least one window is being recorded or is transmitted to an external apparatus.

An example of reducing the size of at least one window based on a signal indicating that content that is reproduced on the at least one window is being recorded or is transmitted to an external apparatus will now be described with reference to FIG. 24.

Figure 24:
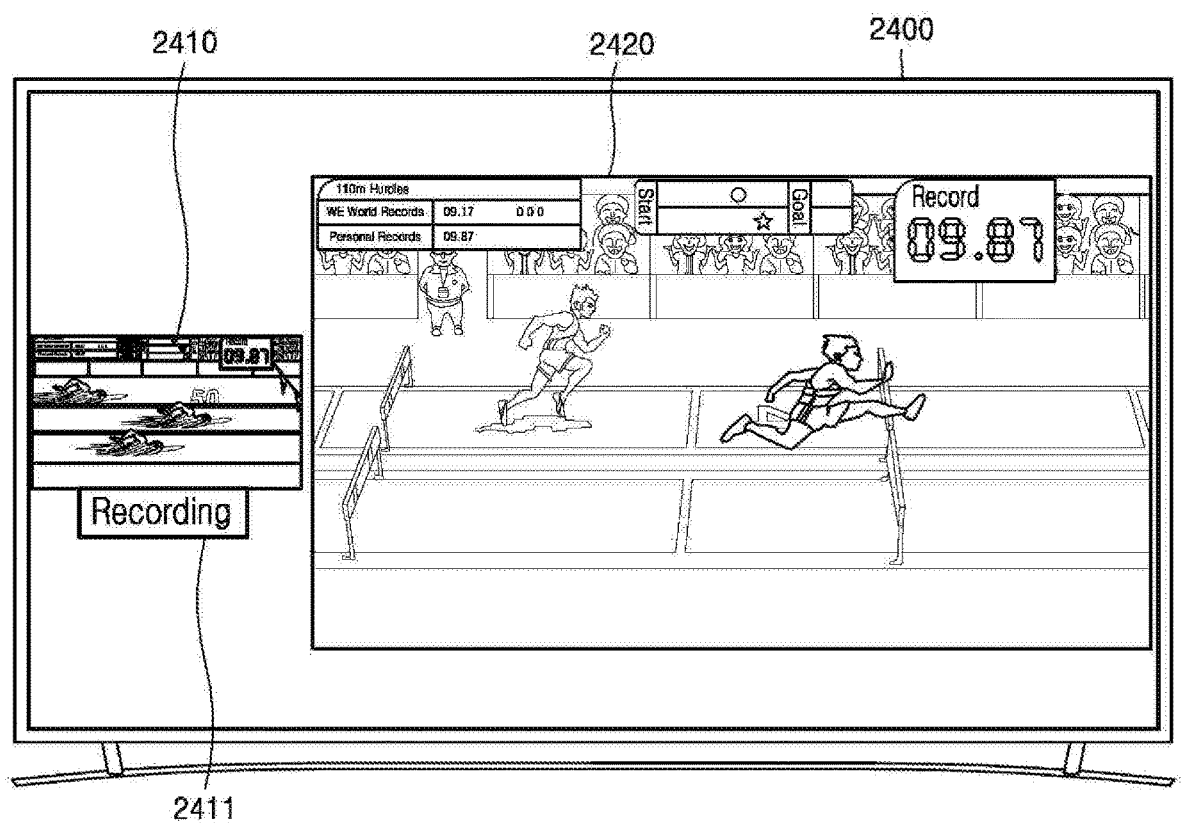
FIG. 24 illustrates an example of reducing the size of at least one window based on a signal representing that content that is reproduced on the at least one window is being recorded or is transmitted to an external apparatus, according to an exemplary embodiment.

FIG. 24 illustrates a multi-window screen image 2400 including two windows 2410 and 2420. A TV broadcasting program may be output on the window 2410, and content received via the Internet may be output on the window 2420. When the TV broadcasting program is output on the window 2410 and then a user starts recording the TV broadcasting program, the controller 180 may reduce the size of the window 2410 and output a message 2411 "recording" on a portion of the window 2410 for the content being recorded. Because a TV broadcasting program is recorded so that a viewer may view the TV broadcasting program later, as opposed to now, a typical viewer is not interested in viewing the TV broadcasting program at this moment. Thus, while the TV broadcasting program in which a viewer is not interested is being output, the size of a window by which the TV broadcasting program is output may be reduced, and the size of the other window may be magnified. Accordingly, the display space may be efficiently utilized.

Figure 25:
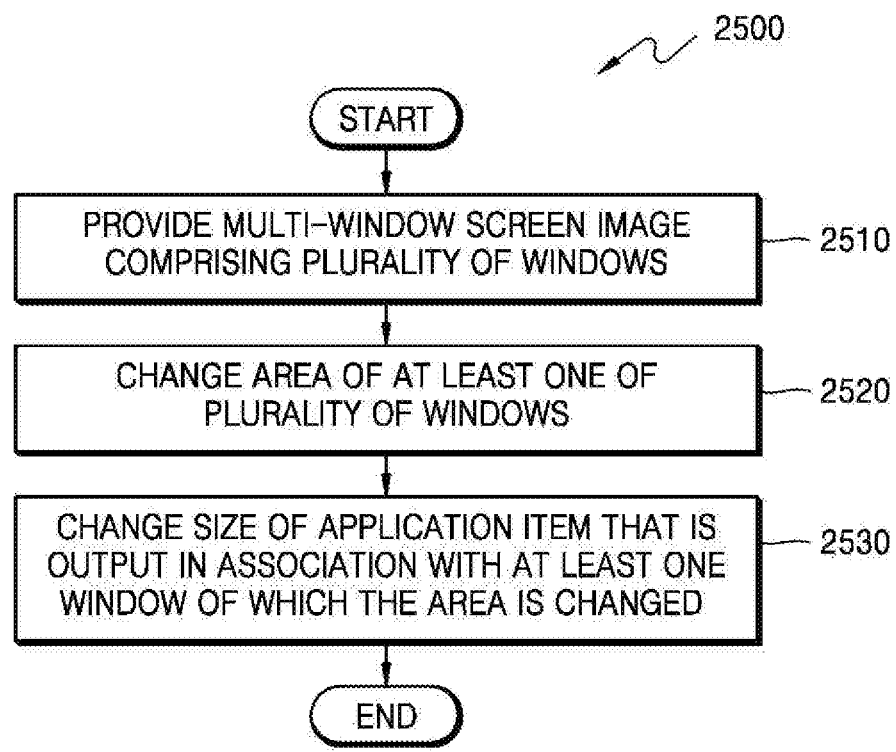
FIG. 25 is a flowchart of a method of operating a display apparatus, according to an exemplary embodiment.

FIG. 25 is a flowchart of a method 2500 of operating the display apparatus 100, according to an exemplary embodiment.

Referring to FIG. 25, in operation 2510, the display apparatus 100 provides a multi-window screen image including a plurality of windows.

In operation 2520, the display apparatus 100 changes the size of at least one of the plurality of windows and provides the at least one window of which the size is changed.

Provision of the multi-window screen image including the plurality of windows and the changing of the size of the at least one window by the display apparatus 100 have already been described above with reference to FIG. 7.

In operation 2530, the display apparatus 100 changes the size of an item of an application that is output in association with the at least one window of which the size is changed.

An example of changing the size of an item of an application that is output in association with an area-changed window will now be described with reference to FIGS. 26A-26C.

Figure 26A:
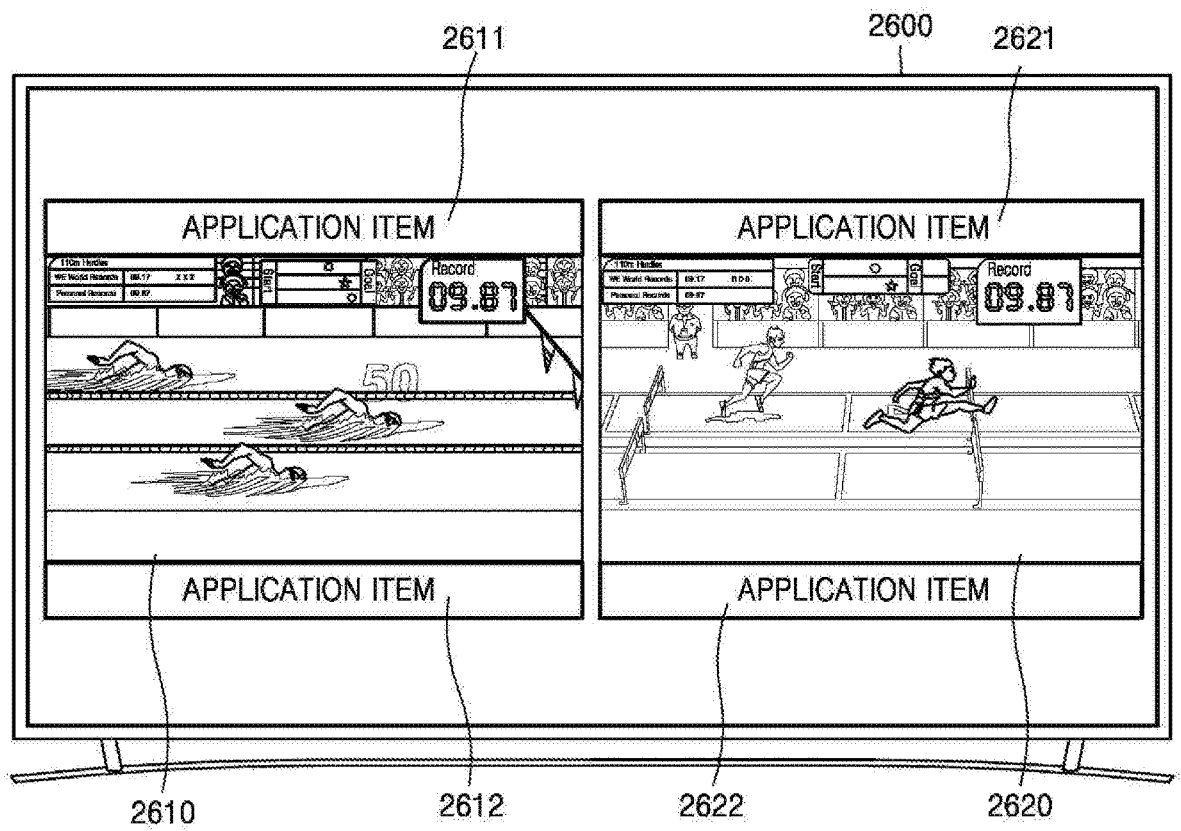
FIGS. 26A-26C illustrate an example of changing the size of an item of an application that is output in association with an area-changed window, according to exemplary embodiments.

FIG. 26A illustrates a multi-window screen image 2600 including two windows 2610 and 2620. A TV broadcasting program may be output on the window 2610, and content received via the Internet may be output on the window 2620.

Application items 2611 and 2612 are displayed on the window 2610, and application items 2621 and 2622 are displayed on the window 2620.

An application item may denote a mini application (e.g., an application program or software) which may be a graphical user interface that supports an interaction between a user and an application program or an operating system. An application item may be a mini application that contains useful functions, such as the weather, a calculator, and a clock, and a variety of information (content). The application item may be produced in the form of a shortcut icon and provided to a multi-window screen image, and thus a user may a service corresponding to the shortcut icon by only clicking the shortcut icon without needing to access a web browser. This application item may be widely known as a widget.

Figure 26B:
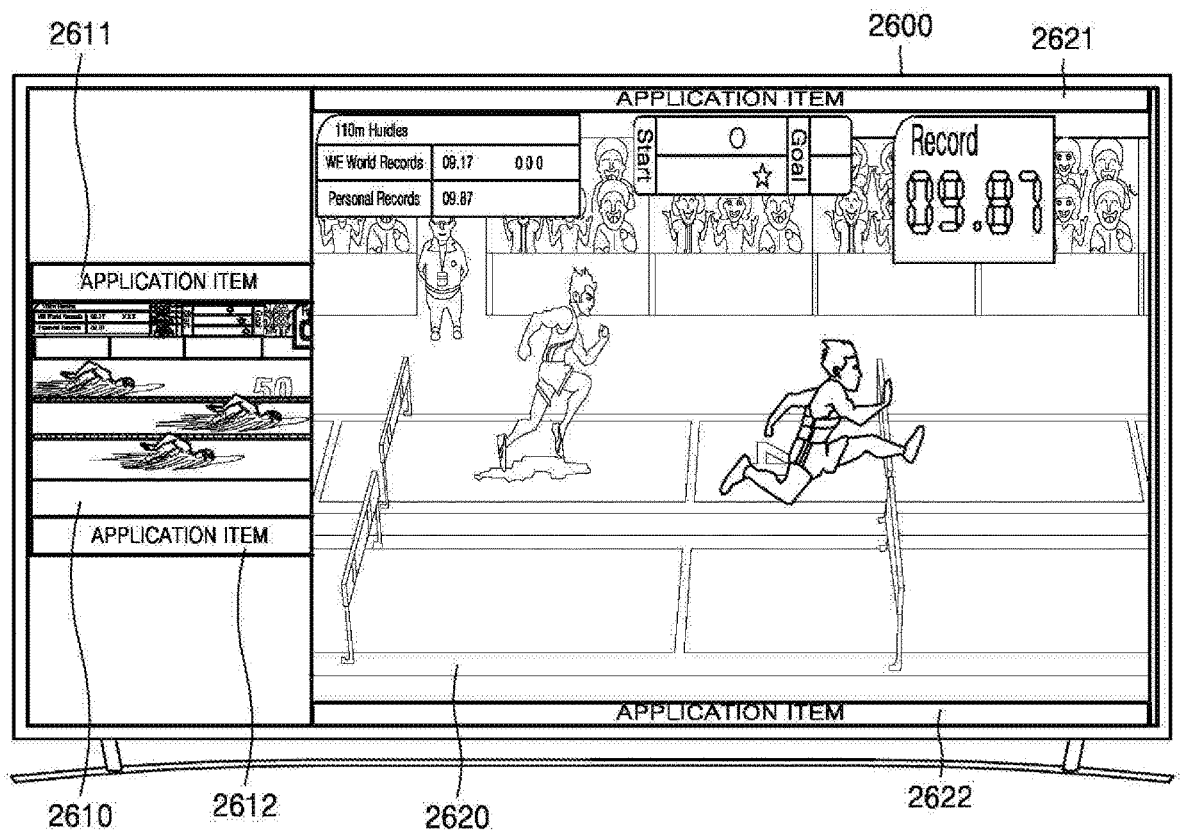
Figure 26C:
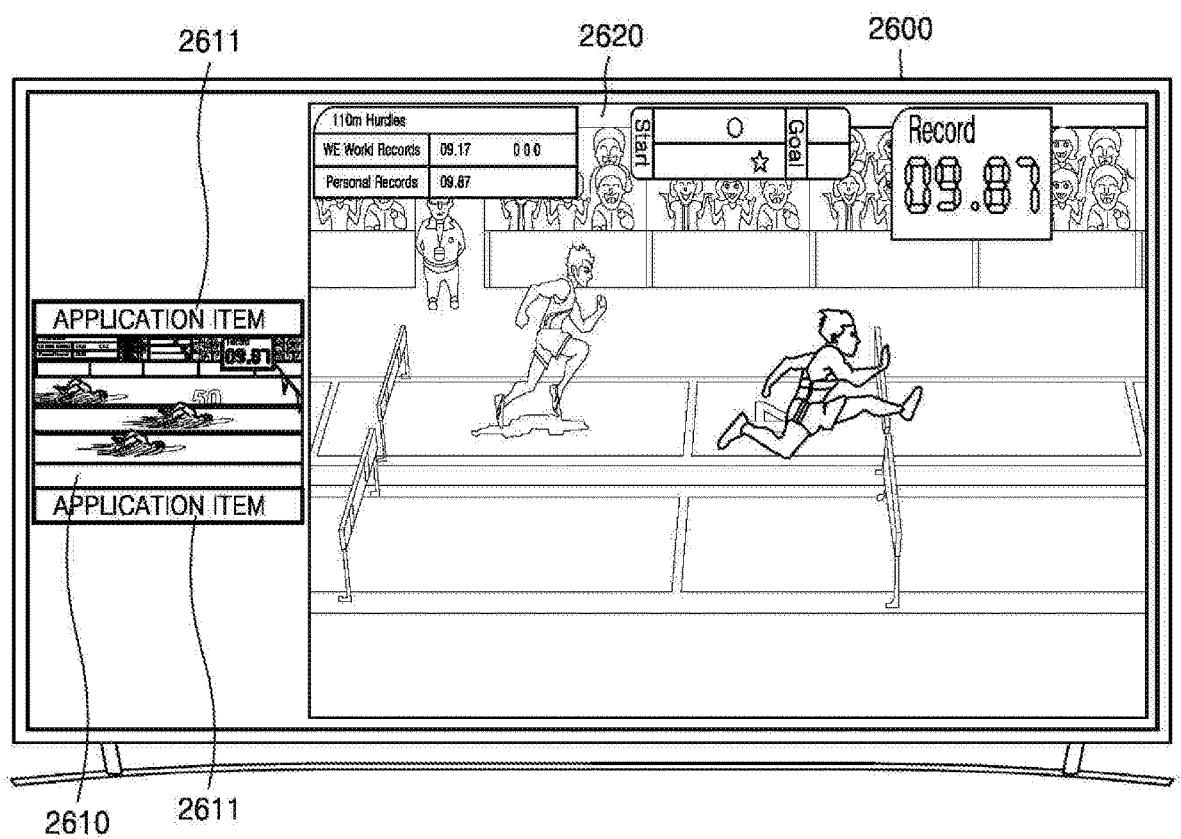

When the size of the window 2620 of the multi-window screen image 2600 including the windows 2610 and 2620 is magnified, the controller 180 may change the size of an item of an application that is output in association with the magnified window 2620, as illustrated in FIG. 26B. Because the window 2620 is magnified, if the application items 2621 and 2622 are output without changes, the space of the multi-window screen image 2600 is insufficient. Thus, the application items 2621 and 2622 may be reduced in size and output. In other exemplary embodiments, the controller 180 may change the locations of the application items 2621 and 2622.

According to an exemplary embodiment, the controller 180 may delete the application items 2621 and 2622 of applications that are output in association with the magnified window 2620.

According to an exemplary embodiment, when a user uses a multi-window screen image including a plurality of windows, the user may use a window according to a predetermined scenario, namely, information preset by the user, and thus the user may automatically view desired content via a desired size window without individually performing a window size setting each time.

According to an exemplary embodiment, when a user uses a multi-window screen image including a plurality of windows, the area of a window may be changed based on content, and thus the display space may be efficiently utilized.

The term 'module' used in one or more exemplary embodiments may indicate, for example, a unit including one selected from hardware, software, firmware, and a combination thereof. The module may be interchangeably used with terms such as 'unit,' 'logic,' 'logical block,' 'component,' or 'circuit.' The module may be a minimum unit or a portion of an integrally formed component. The module may be a minimum unit or a portion performing one or more functions. The module may be implemented mechanically or electronically. For example, a module according to one or more exemplary embodiments may include at least one of an application-specific integrated circuit (ASIC) chip, field-programmable gate arrays (FPGAs), and a programmable-logic device, which perform operations that are already known or to be developed.

While not restricted thereto, an exemplary embodiment can be embodied as computer-readable code on a computer-readable recording medium. For example, a control program that controls the above-described operations may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units can include circuitry, a processor, a microprocessor, etc., and may execute a computer program stored in a computer-readable medium.

The module or the programming module according to one or more exemplary embodiments may include at least one of the aforementioned components, omit some of the aforementioned components, or additionally include other components. Operations performed by the module, the programming module, or other components according to one or more exemplary embodiments may be performed sequentially, in parallel, repeatedly, or heuristically. Some operations may be performed in a different order, omitted, or additionally include other operations.

According to one or more exemplary embodiments, in a storage medium that stores instructions, the instructions are set such that at least one processor performs at least one operation when the instructions are executed by the at least one processor. The at least one operation may include determining a future application to be run in the mobile device, determining whether a current remaining battery life is enough to run a future application based on power consumption of at least one application that is currently-used or to be run before the future application, and selectively outputting a notification informing battery insufficiency of the mobile device based on the determination.

The exemplary embodiments are described with reference to various functional units and processors. However, it will be apparent that any suitable distribution of functionality between different functional units or processors may be used without detracting from the exemplary embodiments. For example, functionality illustrated to be performed by separate processors or controllers may be performed by the same processor or controller and in some examples these functions may be interchangeable. Hence, references to functional units are only to be seen as references to suitable units for providing the described functionality, rather than indicative of a strict logical or physical structure or organization.

The foregoing exemplary embodiments and advantages are examples and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A display apparatus comprising:
a display; and
a controller configured to:
    display a plurality of contents through a plurality of windows on the display, a first content being displayed through a first window, arranged on a first location of the display and having a first size, among the plurality of windows and a second content being displayed through a second window, arranged on a second location of the display and having a second size, among the plurality of windows;
    based on content displayed through the first window being changed from the first content to a third content, obtain attribute information on the third content;
    based on the attribute information on the third content being a first type, increase a size of the second window, arranged on the second location, through which the second content is displayed, and decrease a size of the first window, arranged on the first location, through which the third content is displayed; and
    based on content displayed through the first window being changed from the third content to a fourth content, obtain attribute information on the fourth content;
    based on the attribute information on the fourth content being a second type, restore the first window and the second window, by increasing the first window on the first location of the display to the first size and decreasing the second window on the second location of the display to the second size.

2. The display apparatus of claim 1, wherein the attribute information on the third content comprises attribute information of content which is registered by a user viewing reservation.

3. The display apparatus of claim 1, wherein the attribute information on the third content indicates that the third content is an advertisement.

4. The display apparatus of claim 1, wherein the controller is further configured to determine an identity of a user and change the first window based on a user setting corresponding to the determined identity.

5. A display method comprising:
    displaying a plurality of contents through a plurality of windows on a display of a display apparatus, a first content being displayed through a first window, arranged on a first location of the displayed and having a first size, among the plurality of windows and a second content being displayed through a second window, arranged on a second location of the display and having a second size, among the plurality of windows;
    based on content displayed through the first window being change from the first content to a third content, obtaining attribute information on the third content;
    based on the attribute information on the third content being a first type, increasing a size of the second window arranged on the second location, through which the second content is displayed, and decreasing a size of the first window, arranged on the first location, through which the third content is displayed;
    based on content displayed through the first window being changed from the third content to a fourth content, obtaining attribute information on the fourth content; and
    based on the attribute information on the fourth content being a second type, restoring the first window and the second window, by increasing the first window on the first location of the display to the first size and decreasing the second window on the second location of the display to the second size.

6. The display method of claim 5, wherein the attribute information on the third content comprises attribute information of content which is registered by a user viewing reservation.

7. The display method of claim 5, wherein the attribute information on the third content indicates that the first content is an advertisement.

8. The display apparatus of claim 1, wherein the attribute information on the third content indicates at least one from among a grade of the third content, a rating of the third content, an amount of violence included in the third content, and an amount of sexuality included in the third content.

* * * * *